(12) United States Patent
Oblizajek et al.

(10) Patent No.: US 9,266,558 B2
(45) Date of Patent: Feb. 23, 2016

(54) METHODS, SYSTEMS AND APPARATUS FOR STEERING WHEEL VIBRATION REDUCTION IN ELECTRIC POWER STEERING SYSTEMS

(71) Applicant: GM Global Technology Operations LLC, Detroit, MI (US)

(72) Inventors: Kenneth L. Oblizajek, Troy, MI (US); John D. Sopoci, Commerce Township, MI (US); Suresh Puradchithasan, Ontario (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 13/841,031

(22) Filed: Mar. 15, 2013

(65) Prior Publication Data

US 2013/0211677 A1    Aug. 15, 2013

Related U.S. Application Data

(63) Continuation-in-part of application No. 12/882,852, filed on Sep. 15, 2010.

(51) Int. Cl.
*B62D 5/04* (2006.01)

(52) U.S. Cl.
CPC ............. *B62D 5/0472* (2013.01); *B62D 5/046* (2013.01)

(58) Field of Classification Search
CPC . B62D 5/0472; B62D 5/046; B60G 2400/208
USPC ............... 701/41, 42; 280/124, 108; 180/446, 180/410, 412, 443
See application file for complete search history.

(56) References Cited

U.S. PATENT DOCUMENTS

| 4,885,722 A | 12/1989 | Leland |
| 5,473,231 A | 12/1995 | McLaughlin et al. |

(Continued)

FOREIGN PATENT DOCUMENTS

| CN | 101746412 A | 6/2010 |
| CN | 101821150 A | 9/2010 |

(Continued)

OTHER PUBLICATIONS

State Intellectual Property Office of the P.R.C., Office Action for Chinese Patent Application No. 201110272866.4, mailed Aug. 30, 2013.

(Continued)

*Primary Examiner* — Spencer Patton
(74) *Attorney, Agent, or Firm* — Ingrassia Fisher & Lorenz, P.C.

(57) ABSTRACT

Methods and systems are provided for suppression of steering wheel vibrations generated by periodic disturbances in a vehicle steering system. An exemplary method reducing steering wheel vibrations caused by periodic disturbances involves determining a gross torque attributable to the periodic disturbances in the steering system, identifying a desired amount of suppression of the vibrations at the steering wheel, determining an offset torque based on the gross torque and the desired amount of suppression, and generating a motor command signal in a manner that is influenced by the offset torque. The motor drive command signal is provided to an electric motor coupled the steering wheel and/or the vehicle tires, and the motor drive command signal influences the torque applied by the motor to assist steering of the vehicle tires by the steering wheel in a manner that attenuates the vibrations communicated to the steering wheel by the desired amount.

20 Claims, 6 Drawing Sheets

(56) References Cited

U.S. PATENT DOCUMENTS

| | | | |
|---|---|---|---|
| 5,504,403 | A | 4/1996 | McLaughlin |
| 5,919,241 | A | 7/1999 | Bolourchi et al. |
| 6,064,931 | A | 5/2000 | Sawada et al. |
| 6,122,579 | A | 9/2000 | Collier-Hallman et al. |
| 6,137,886 | A | 10/2000 | Shoureshi |
| 6,161,068 | A | 12/2000 | Kurishige et al. |
| 6,263,738 | B1 | 7/2001 | Hogle |
| 6,625,530 | B1 | 9/2003 | Bolourchi |
| 6,647,329 | B2 | 11/2003 | Kleinau et al. |
| 6,681,883 | B2 | 1/2004 | Loh et al. |
| 6,714,858 | B2 | 3/2004 | Oblizajek et al. |
| 6,742,620 | B2 | 6/2004 | Eidam et al. |
| 6,827,177 | B2 | 12/2004 | Asada et al. |
| 6,999,862 | B2 | 2/2006 | Tamaizumi et al. |
| 7,068,923 | B2 | 6/2006 | Miyazaki |
| 7,079,929 | B2 | 7/2006 | Sawada et al. |
| 7,222,008 | B2 | 5/2007 | Takahashi et al. |
| 7,363,135 | B2 | 4/2008 | Lin et al. |
| 7,604,088 | B2 | 10/2009 | Nishizaki et al. |
| 8,046,131 | B2 | 10/2011 | Tanaka et al. |
| 2001/0047233 | A1 | 11/2001 | Kleinau et al. |
| 2002/0033300 | A1 | 3/2002 | Takeuchi et al. |
| 2002/0043423 | A1 | 4/2002 | Endo et al. |
| 2002/0056587 | A1 | 5/2002 | Shibasaki et al. |
| 2002/0059824 | A1 | 5/2002 | Ono et al. |
| 2003/0106736 | A1 | 6/2003 | Kogiso et al. |
| 2004/0099471 | A1 | 5/2004 | Asada et al. |
| 2004/0138797 | A1 | 7/2004 | Yao et al. |
| 2004/0204812 | A1 | 10/2004 | Tran |
| 2004/0245041 | A1 | 12/2004 | Fukuda et al. |
| 2005/0027417 | A1 | 2/2005 | Sawada et al. |
| 2005/0119810 | A1 | 6/2005 | Kasbarian et al. |
| 2005/0140322 | A1 | 6/2005 | Itakura |
| 2005/0182541 | A1 | 8/2005 | Tamaizumi et al. |
| 2005/0274560 | A1 | 12/2005 | Wakao et al. |
| 2006/0001392 | A1 | 1/2006 | Ajima et al. |
| 2006/0180369 | A1 | 8/2006 | Brosig et al. |
| 2007/0107978 | A1 | 5/2007 | Aoki et al. |
| 2007/0118262 | A1 | 5/2007 | Nishizaki et al. |
| 2007/0120511 | A1 | 5/2007 | Kobayashi et al. |
| 2007/0198153 | A1 | 8/2007 | Oya et al. |
| 2007/0201704 | A1 | 8/2007 | Ishii et al. |
| 2007/0205041 | A1 | 9/2007 | Nishizaki et al. |
| 2007/0250234 | A1 | 10/2007 | Ito et al. |
| 2008/0001728 | A1 | 1/2008 | Dufournier |
| 2008/0035411 | A1 | 2/2008 | Yamashita et al. |
| 2008/0189014 | A1 | 8/2008 | Tanaka et al. |
| 2008/0243329 | A1 | 10/2008 | Hamel et al. |
| 2008/0262678 | A1 | 10/2008 | Nishimura et al. |
| 2008/0297077 | A1 | 12/2008 | Kovudhikulrungsri et al. |
| 2009/0125186 | A1 | 5/2009 | Recket et al. |
| 2009/0187312 | A1 | 7/2009 | Nozawa et al. |
| 2009/0224502 | A1 | 9/2009 | Yamawaki et al. |
| 2009/0294206 | A1 | 12/2009 | Oblizajek et al. |
| 2010/0138109 | A1 | 6/2010 | Wang et al. |
| 2011/0153162 | A1 | 6/2011 | Kezobo et al. |
| 2012/0061169 | A1 | 3/2012 | Oblizajek et al. |
| 2013/0030654 | A1 | 1/2013 | Oblizajek et al. |

FOREIGN PATENT DOCUMENTS

| | | |
|---|---|---|
| DE | 102005003180 A1 | 7/2006 |
| DE | 102006051747 A1 | 5/2007 |
| DE | 102006051757 A1 | 5/2008 |
| DE | 102006057880 A1 | 6/2008 |
| DE | 102007014344 A1 | 10/2008 |
| DE | 102008059906 A1 | 6/2010 |
| EP | 1502837 A1 | 2/2005 |
| EP | 2030868 A1 | 3/2009 |
| EP | 1975040 B1 | 10/2009 |
| JP | 2000168600 A | 6/2000 |
| JP | 2001138939 A | 5/2001 |
| JP | 2006335228 A | 12/2006 |
| JP | 2007161006 A | 6/2007 |
| JP | 2009023582 A | 2/2009 |
| WO | 2008116555 A1 | 10/2008 |
| WO | 2009154119 A1 | 12/2009 |

OTHER PUBLICATIONS

German Office Action, dated Feb. 8, 2012, for German Patent Application No. 102011086295.1.
USPTO, Final Office Action for U.S. Appl. No. 12/882,852, mailed Apr. 5, 2013.
USPTO, Response to Final Office Action for U.S. Appl. No. 12/882,852, mailed May 2, 2013.
USPTO, Office Action for U.S. Appl. No. 12/882,852, mailed Sep. 15, 2014.
USPTO, Response to Final Office Action for U.S. Appl. No. 12/882,852, mailed Jul. 17, 2013.
U.S. Appl. No. 12/967,112, filed Dec. 14, 2010.
U.S. Appl. No. 12/326,684, filed Dec. 2, 2008.
U.S. Appl. No. 12/882,852, filed Sep. 15, 2010.
USPTO, Office Action in U.S. Appl. No. 12/882,852, mailed Jan. 29, 2013.
USPTO, Office Action in U.S. Appl. No. 12/967,112, mailed Feb. 15, 2013.
USPTO, Response to Office Action in U.S. Appl. No. 12/882,852, mailed Mar. 14, 2013.
USPTO, Response to Office Action in U.S. Appl. No. 12/967,112, mailed May 8, 2013.
State Intellectual Property Office of the People's Republic of China, Office Action in Chinese Patent Application No. 201110417142.4, mailed Oct. 8, 2014.
USPTO, Final Office Action in U.S. Appl. No. 12/967,112, mailed Oct. 18, 2013.
The State Intellectual Property Office of the People's Republic of China, Office Action in Chinese Patent Application No. 201110417142A, mailed Dec. 3, 2013.
USPTO, Response to Office Action in U.S. Appl. No. 12/967,112, mailed Feb. 18, 2014.
The State Intellectual Property Office of the People's Republic of China, Office action in Chinese Patent Application No. 201110417142A, mailed Jun. 4, 2014.
The State Intellectual Property Office of the People's Republic of China, Office action in Chinese Patent Application No. 201110272866.4, mailed Sep. 25, 2014.
USPTO, Office Action in U.S. Appl. No. 12/967,112, mailed Oct. 2, 2014.
German Patent and Trade Mark Office, Office Action in German Patent Application No. 10 2011 086 295.1, mailed Dec. 4, 2014.
USPTO, Response to Office Action for U.S. Appl. No. 12/882,852, mailed Dec. 15, 2014.
USPTO, Final Office Action for U.S. Appl. No. 12/882,852, mailed Dec. 31, 2014.
USPTO, Response to Office Action for U.S. Appl. No. 12/967,112, mailed Jan. 2, 2015.
State Intellectual Property Office of the People's Republic of China, Office Action in Chinese Patent Application No. 201110272866.4, mailed Apr. 16, 2014.
USPTO, Office Action in U.S. Appl. No. 12/882,852 mailed Jun. 8, 2015.
USPTO, Final Office Action in U.S. Appl. No. 12/967,112 mailed Jun. 5, 2015.
USPTO, Response to Office Action for U.S. Appl. No. 12/967,112 mailed Jan. 2, 2015.
USPTO, Response to Final Office Action for U.S. Appl. No. 12/882,852 mailed Mar. 31, 2015.
USPTO, Office Action in U.S. Appl. No. 12/967,112 mailed Sep. 17, 2015.
State Intellectual Property Office of the People'S Republic of China, Office Action in Chinese Patent Application No. 201410094270.3 mailed Nov. 4, 2015.

METHODS, SYSTEMS AND APPARATUS FOR STEERING WHEEL VIBRATION REDUCTION IN ELECTRIC POWER STEERING SYSTEMS

CROSS REFERENCE TO RELATED APPLICATIONS

This is a continuation-in-part of application Ser. No. 12/882,852, filed Sep. 15, 2010.

TECHNICAL FIELD

Embodiments of the present invention generally relate to Electric Power Steering (EPS) systems, and more particularly relate to techniques for reducing periodic steering wheel vibrations (SWVs) that occur within an EPS system.

BACKGROUND

Electric Power Steering (EPS) systems use an electric motor that can be coupled directly to either the steering gear or steering column to reduce a driver's effort in steering the vehicle. To explain further, during operation of the vehicle, the driver will apply a force to the steering wheel (SW) in an effort to steer the vehicle. This results in a "driver torque" being applied to a shaft that is coupled to the SW. Torque sensors detect torque being applied to the steering column by the driver, and communicate this information to an electronic control unit. The electronic control unit generates a motor control signal that is applied to the electric motor causing it to generate a "motor assist torque" that is combined with the driver torque. This combined torque is then used to steer the "corners" of the vehicle. This allows varying amounts of assistance to be applied depending on driving conditions.

There are numerous types of unwanted vibrations, noises, pulsations, disturbances, and other forms of fluctuating vibratory energy that can exist in a vehicle; these phenomena are hereafter collectively and broadly referred to as "vibrations." Vibrations can have many sources, including external sources such as irregular road surfaces, as well as internal sources.

When a vehicle operates at typical highway speeds (e.g., 72.42 to 144.84 kilometers per hour, or 45 to 90 miles per hour), the excitation of irregularities at the corners of a vehicle can result in internally-generated periodic torsional vibrations at the vehicle's steering wheel. As used herein, the term "corner" refers to parts at the roadwheel positions of a vehicle from the tie-rod outward. The parts that make up a corner may include a tire, wheel, brake rotor, hub bearing assembly, control arm, knuckle, bushings, etc. An example of an internal source of vibrations is a non-concentric, out-of-round, or otherwise irregular rotating part. For instance, if a tire, wheel, hub and/or rotor is manufactured or mounted to the vehicle in a non-concentric or off-balance manner, then the part rotates with an uneven weight distribution. This, in turn, can produce periodic or harmonic vibrations in the vehicle; that is, vibrations having a first order component centered at a first order frequency, as well as higher- or multi-order components centered at frequencies that are integer multiples of the first order frequency. A first order component of a periodic vibration is centered at the same frequency as the rotating object from which it emanates and, for steering systems, usually has a greater amplitude or intensity than its higher-order counterparts. For example, a wheel rotating at fifteen rotations per second (15 Hz) can produce periodic vibrations having a first order component at 15 Hz, a second order component at 30 Hz, a third order component at 45 Hz, and so on. The first order or 15 Hz component is usually more intense than the second and third order components. It should be appreciated that non-concentric rotating parts are only one potential source of periodic vibrations in a vehicle, as many others also exist.

Periodic vibrations caused by internal sources can propagate throughout the vehicle and can cause an undesirable shake or movement of certain vehicle components that is noticeable to the driver. For instance, periodic vibrations generated at the wheel assemblies or corners can combine to create a dynamic torque on a steering wheel column component that causes the steering wheel to cyclically turn at small amplitudes in either direction. When this type of event occurs on a flat or smooth road surface, it is all the more apparent to the driver and is sometimes referred to as "smooth road shake (SRS)" or "torsional nibble". These vibrations can be sensed by the driver of the vehicle and will be referred to herein as steering wheel vibrations (SWVs). The frequencies of SWVs are usually proportional to speed and a first order harmonic of the tire rotation frequency (e.g., the rolling frequency of the tire). Dynamic amplitudes are small, near or in excess of the thresholds of perception at 0.03 degrees.

A variety of techniques for reducing or mitigating periodic vibrations in the vehicle have been developed. These techniques include on- and off-vehicle wheel balancing, using different types of damping components, and attempting to machine or otherwise produce more concentric and precise parts. In vehicles that implement electronic power steering systems (EPSs), EPS-control algorithms have been developed that allow for active-SWV suppression methods to be implemented, but these algorithms may be more costly, and require new hardware and/or wiring, or they may not be as effective for suppression. These algorithms may also interfere with normal driving operation (i.e., effect the perception of the steering performance as sensed by the driver), and/or render the system less stable (in a vibratory sense) by producing larger aperiodic SWVs on rough roads, or achieving vibratory limit-cycle conditions.

Accordingly, it would be desirable to provide improved methods, systems and apparatus for suppressing SWVs in an EPS system. It would be desirable if such methods, systems and apparatus do not require additional hardware or wiring such that they can be applied generally in many types of vehicles without requiring substantial modifications. Furthermore, other desirable features and characteristics of the present invention will become apparent from the subsequent detailed description and the appended claims, taken in conjunction with the accompanying drawings and the foregoing technical field and background.

SUMMARY

Embodiments of the present invention relate to methods, systems and apparatus for suppressing steering wheel vibrations (SWVs) that occur at the steering wheel of a vehicle that implements an electric power steering (EPS) system.

In one embodiment, an electrical power steering (EPS) system is provided that can be implemented in a vehicle to reduce steering wheel vibrations (SWVs) communicated to the vehicle's steering wheel. The EPS system includes an electric motor designed to generate a motor torque in response to a motor control signal, and a sensor that detects a torque and generates a periodic electrical torque signal that represents torque sensed between the steering wheel and gearing of the electric motor.

In some embodiments, it may be desirable to control or otherwise adjust the amount (or level) at which steering wheel vibrations attributable to periodic disturbances within a steering system are suppressed/attenuated. Accordingly, an exemplary method is provided for reducing steering wheel vibrations caused by periodic disturbances that involves determining an estimated gross torque attributable to the periodic disturbances in the steering system, identifying a desired amount of suppression of the vibrations, and determining an offset torque based on the gross steering wheel torque and the desired amount of suppression. The offset torque is utilized to generate adjusted quadrature and coincident torque components that are provided to the corresponding extraction modules for generating extraction signals based thereon, such that the generated gain-and-phase compensated motor drive command signal is influenced by the offset torque. In this manner, the offset torque influences the motor torque applied by the electric motor used to assist steering to attenuate the vibrations communicated to the steering wheel by the desired amount.

In accordance with one or more embodiments, a vehicle includes a steering wheel coupled to one or more tires of the vehicle to facilitate steering the one or more tires, an electric motor coupled to the one or more tires and/or the steering wheel to generate a motor torque that assists the steering of the one or more tires, and a control module coupled to the electric motor. The control module determines a gross torque attributable to periodic disturbances in the vehicle, identifies a desired amount of suppression for the periodic disturbances at the steering wheel, determines an offset torque based on the gross torque and the desired amount of suppression, and generates a motor drive command signal in a manner that is influenced by the offset torque, wherein the motor drive command signal is applied to the electric motor to control the motor torque and attenuate the periodic disturbances communicated to the steering wheel by the desired amount.

In another embodiment, a method is provided for reducing steering wheel vibrations caused by periodic disturbances in a steering system corresponding to one or more tires of a vehicle, the steering system including the steering wheel to facilitate steering of the one or more tires and an electric motor coupled to the steering wheel and/or the one or more tires to generate a motor torque that assists the steering of the one or more tires. The method involves determining quadrature and coincident components of a measured disturbance torque at an angular frequency corresponding to the one or more tires, determining a cancellation component of the motor torque, and determining a gross torque attributable to the periodic disturbances in the steering system based on the cancellation component and the quadrature and coincident components of the measured disturbance torque at the angular frequency. The method continues by identifying a gain factor corresponding to a desired amount of suppression of the vibrations and multiplying the gross torque by the gain factor to obtain an offset torque. The method continues by transforming the offset torque to quadrature and coincident offset torque components, generating a quadrature extracted component corresponding to an amplitude envelope of a first difference between the quadrature component of the measured disturbance torque at the angular frequency and the quadrature offset torque component, and generating a coincident extracted component corresponding to an amplitude envelope of a second difference between the coincident component of the measured disturbance torque at the angular frequency and the coincident offset torque component. The motor drive command signal is generated based at least in part on the quadrature and coincident extracted components, and the motor drive command signal influences the motor torque to attenuate the vibrations communicated to the steering wheel by the desired amount.

DESCRIPTION OF THE DRAWINGS

Embodiments of the present invention will hereinafter be described in conjunction with the following drawing figures, wherein like numerals denote like elements.

DETAILED DESCRIPTION

Figure 1:
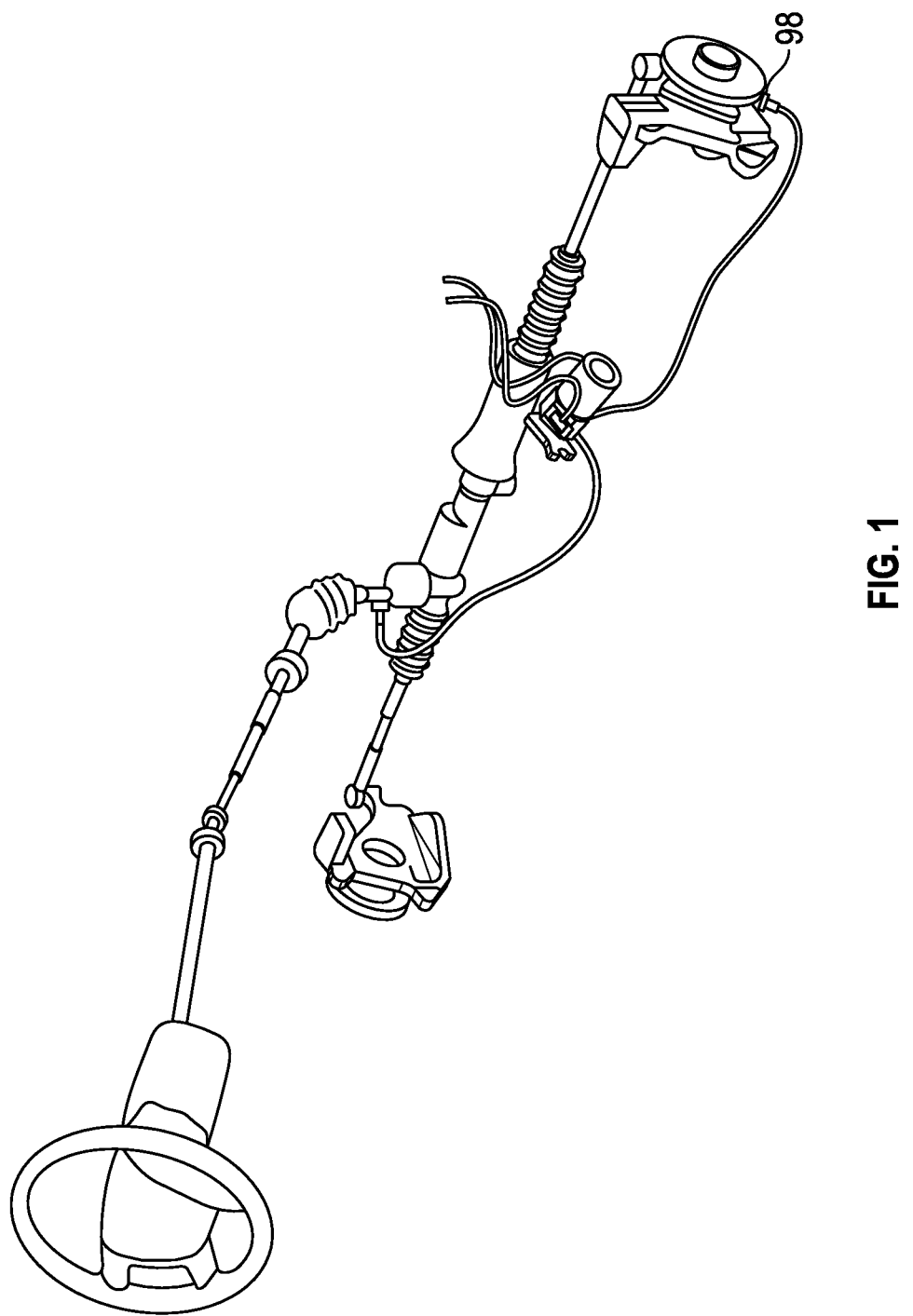
FIG. 1 illustrates a perspective view of an exemplary rack mounted electric power steering (EPS) system used in a vehicle.

The following detailed description is merely exemplary in nature and is not intended to limit the application and uses. Furthermore, there is no intention to be bound by any expressed or implied theory presented in the preceding technical field, background, brief summary or the following detailed description.

Before describing in detail embodiments that are in accordance with the present invention, it should be observed that the embodiments relate to methods, systems, and apparatus for suppression or reduction of steering wheel vibrations (SWVs) in a vehicle that implements an electric power steering (EPS) system. The methods, systems, and apparatus described herein can be used to reduce the effects of periodic vibrations in an electric power steering (EPS) system, particularly those that can lead to smooth road shake (SRS), torsional nibble, and/or other undesirable conditions. According to an exemplary embodiment, a controller is provided that can generate appropriate motor control signals that, when applied to an electric EPS motor, will counter-act vibrations in the EPS system to cancel out the periodic vibrations generated by one or more wheel assemblies or corners.

For purposes of discussion, the EPS system can be artificially partitioned into a first portion located above the sensor and a second portion that is located below the sensor. In general terms, the first portion comprises the vehicle's steering wheel, and the second portion includes the electric motor. As will be appreciated by those skilled in the art, in a rack-mounted EPS system the sensor is located at an input shaft to a steering gear, and the first portion located above the sensor includes elements such as the steering wheel, steering column, I-Shaft, flex couplings, etc., whereas the second portion that is located below the sensor includes elements such as the electric motor, a pinion, a rack, tie rods, corner suspension, etc. By contrast, in a column-mounted EPS system the sensor is integrated within the steering column and located between the steering wheel and gearing of the electric motor to the steering wheel shaft. The first portion located above the sensor includes elements such as the steering wheel, whereas the second portion located below the sensor includes elements such as the electric motor, I-Shaft, flex couplings, tie rods, the corner suspension, etc.

The vehicle comprises an in-vehicle local area network (LAN). The LAN communicates angular position information regarding the change in angular position of a tire (or tires) over a time interval. For instance, in one implementation, the angular position information can be anti-lock brake system (ABS) pulsetrain information that is regularly communicated over the in-vehicle LAN. This ABS pulsetrain information takes the form of a number (N) of pulses received over a time interval, and can be used to determine that a tire has rotated over a certain angular movement during a time interval.

In accordance with some of the disclosed embodiments, the EPS system includes an electronic control unit (ECU). A first module implemented in the ECU includes an estimator module which generates an estimated instantaneous angular velocity signal based on the angular position information. The estimated instantaneous angular velocity signal corresponds to a particular angular frequency of the tire at an instant in time. The first module also includes an integrator module designed to generate an estimated angular position signal (that corresponds to the tire) based on the estimated instantaneous angular velocity signal.

In accordance with the disclosed embodiments, the ECU generates a gain-and-phase-compensated motor drive command signal at the particular angular frequency. The gain-and-phase-compensated motor drive command signal is fed back to adjust the current of the electric motor, and control the motor torque such that selected periodic content of an angular difference between a first angular displacement ($\theta_{above\_sensor}$) of the first portion (above the sensor) and a second angular displacement ($\theta_{below\_sensor}$) of the second portion (below the sensor), detected by an electronic signal, is reduced. The ECU uses the estimated angular velocity and estimated angular position of the tire (along with other amplitude and phase adjustments described below) to ensure that the ECU operates at the correct frequency to ensure that the periodically fluctuating angular difference is reduced. This way, the gain-and-phase-compensated motor drive command signal causes the electric motor to adjust the motor torque to dynamically reduce periodic content in the periodic electrical torque signal (at the particular angular frequency corresponding to a disturbance signal sensed by the sensor) thereby attenuating vibrations communicated to the steering wheel.

In accordance with some of the disclosed embodiments, a second module implemented in the ECU includes a sinusoid generator module, a heterodyning module, and an extraction module.

The sinusoid generator module generates, based on the estimated angular position signal, sinusoidal carrier signals at the periodic frequency that corresponds to the estimated angular velocity (e.g., the estimated tire frequency). The sinusoidal carrier signals comprise: a sine-function carrier signal at a periodic frequency that corresponds to an expected periodic disturbance signal at the sensor, and a cosine-function carrier signal at the periodic frequency that corresponds to the expected periodic disturbance signal at the sensor and that is 90 degrees out of phase with respect to the sine-function carrier signal. It is noted that the periodic electrical torque signal has frequency content at the frequency of the sinusoidal carrier signals, but that the amplitude of the periodic electrical torque signal content and the phase offset between the periodic electrical torque signal and the sinusoidal carrier signals are unknown.

The heterodyning module individually mixes the sinusoidal carrier signals with the periodic electrical torque signal to generate a mixed sine signal that relates to an extracted quadrature component of the amplitude of the periodic disturbance signal observed at the sensor module, and a mixed cosine signal that relates to an extracted coincident component of the amplitude of the periodic disturbance signal observed at the sensor module.

Each of the extraction modules implement a proportional-integral-derivative sub-module (PID sub-module) that operates on the mixed sine signal and the mixed cosine signal, respectively. Each PID sub-module can apply a proportional (P) gain, an integral (I) gain, and a derivative (D) gain to the mixed sine or cosine signal. The P, I, D gains can be tuned according to adjustment input parameters that depend on the specific system. The extraction modules can thus perform a proportionality scaling function, an integration scaling function, and/or a differentiation scaling function (collectively referred to in the art as "Proportional-Integral-Derivative (PID)" scaling functions) and, optionally, separate low-pass filtering stages at the output of each gain block. The output of this extraction module is a weighted, combined signal with scaled proportionality, integral and derivative constituents. In other words, the first extraction module operates on the mixed sine signal and the second extraction module operates on the mixed cosine signal to generate signals including a first extraction signal that represents a weighted, combined first mixed sine signal; and a second extraction signal that represents a weighted, combined first mixed cosine signal.

The optional low-pass filtering that may be implemented can be used to extract low frequency content from the internal PID signals to generate filtered signals that can be summed to produce the combined extraction signals. In some embodiments, each of the extractor modules can also receive adjustment input parameters that are used to change the characteristics of the extractor modules (e.g., decrease the response time to follow relatively rapid transients related to speed fluctuations during longitudinal acceleration or longitudinal deceleration of the vehicle, and/or increase the response time during steering events). Enforced continuity at discrete changes of conditions (e.g., from non-steered to steered, or from non-acceleration to acceleration, and vice versa) can be imposed as a state change of the integrator function, and can be easily implemented using methods known to those skilled in the art.

For example, in one embodiment, the first extraction module comprises a first proportional-integral-derivative (PID) sub-module, first filters and a first adder. The first proportional-integral-derivative (PID) sub-module receives adjustable input parameters and scales the mixed sine signal by applying respective gains of proportional, integral and derivative gain blocks to generate a proportional-scaled sine signal, an integral-scaled sine signal, and a derivative-scaled sine signal. In one embodiment, the respective gains can be varied based on adjustment input parameters. A first filter is provided for each the proportional-scaled sine signal, the integral-scaled sine signal, and the derivative-scaled sine signal. The first filters are designed to extract low frequency content from the proportional-scaled sine signal, the integral-scaled sine signal, and the derivative-scaled sine signal to generate a filtered-proportional-scaled sine signal, a filtered-integral-scaled sine signal, and a filtered-derivative-scaled sine signal. The first adder sums the filtered-proportional-scaled sine signal, the filtered-integral-scaled sine signal, and the filtered-derivative-scaled sine signal to generate a first extracted signal that is a weighted-combined version of the filteredproportional-scaled sine signal, the filtered-integral-scaled sine signal, and the filtered-derivative-scaled sine signal.

The second extraction module includes similar adder, gain blocks, and filters, and uses these components to generate a second extracted signal that is a weighted-combined version of the filtered-proportional-scaled cosine signal, the filtered-integral-scaled cosine signal, and the filtered-derivative-scaled cosine signal.

The multiplexer module then multiplexes the extracted sine signal and the extracted cosine signal to generate multiplexed extracted signals.

Prior to deploying the EPS system, a transfer function is estimated that characterizes the dynamic relationship between the motor drive command to the electric motor and the periodic electrical torque signal output of the sensor. This estimated transfer function can be used to generate an inverse transfer function that is a discretized representation of the inverse of the estimated transfer function with lead compensation. This inverse transfer function can be used to generate a look-up table that includes a plurality of entries. Each entry comprises: (1) either a frequency or a value of instantaneous angular velocity; (2) a carrier phase angle adjustment value corresponding to the frequency or value of the instantaneous angular velocity and desired lead compensation, and (3) a gain adjustment value corresponding to the frequency or value of the instantaneous angular velocity. The carrier phase angle adjustment value is the sum of the angle of an inverse transfer function and lead compensation at the frequency or value of instantaneous angular velocity, and the gain adjustment value is the magnitude of the inverse transfer function at the frequency or value of instantaneous angular velocity.

In accordance with some of the disclosed embodiments, a third module implemented in the ECU includes a carrier phase angle adjustment and modulation module, a combiner module and a gain module.

In one embodiment, the carrier phase angle adjustment and modulation module comprises a first mixer module and a second mixer module. The first mixer module generates a phase-adjusted sine-function carrier signal by modifying the sine-function carrier signal based on the carrier phase angle adjustment value and the lead compensation information at the value of the estimated instantaneous angular velocity. The first mixer module then amplitude modulates the phase-adjusted sine-function carrier signal, based on the extracted sine signal and the extracted cosine signal, to generate a phase-adjusted-amplitude-modulated sine carrier signal. For instance, in one implementation, the first mixer module generates the phase-adjusted-amplitude-modulated sine carrier signal by computing $\cos(u[4])*u[2]-\sin(u[4])*u[3])*u[1]$, where $u[1]$ is the sine-function carrier signal, $u[2]$ is the extracted sine signal, $u[3]$ is the extracted cosine signal, and $u[4]$ is the carrier phase angle adjustment value adjustment signal.

The second mixer module generates a phase-adjusted cosine-function carrier signal by modifying the cosine-function carrier signal based on the carrier phase angle adjustment value and the lead compensation information at the value of the estimated instantaneous angular velocity. The second mixer module then amplitude modulates the phase-adjusted cosine-function carrier signal based on the extracted sine signal and the extracted cosine signal to generate a phase-adjusted-amplitude-modulated cosine carrier signal. In one implementation, the second mixer module generates the phase-adjusted-amplitude-modulated cosine carrier signal by computing $\cos(u[4])*u[3]+\sin(u[4])*u[2])*u[5]$, where $u[2]$ is the extracted sine signal, $u[3]$ is the extracted cosine signal, $u[4]$ is the carrier phase angle adjustment value adjustment signal, and $u[5]$ is the cosine-function carrier signal.

The combiner module combines the first and second phase-adjusted-amplitude-modulated carrier signals to generate a summed phase-adjusted-amplitude-modulated carrier signal, and the gain module applies a gain to the summed phase-adjusted-amplitude-modulated carrier signal to generate the gain-and-phase-compensated motor drive command signal. The gain is based on the gain adjustment value ($|TF(f)^{-1}|$) that corresponds to the value of the estimated instantaneous angular velocity.

FIG. 1 illustrates a perspective view of an exemplary rack mounted electric power steering (EPS) system 10 used in a vehicle. The rack mounted EPS system 10 shown in FIG. 1 is described in United States Patent Application Publication Number 2009/0294206 entitled "Reducing The Effects Of Vibrations In An Electric Power Steering (EPS) System," filed May 30, 2008, which is assigned to the assignee of the present invention and is incorporated by reference herein in its entirety. For sake of brevity, the description of FIG. 1 will not be repeated here again.

In a conventional EPS system, when the corners of the vehicle are rotated, this results in excitations at the corners that can cause vibrations at the SW of the vehicle. Excitations at the corners of the vehicle are defined (in part) by the periodic rotation of the tire. If the Electronic Control Unit (ECU) (not shown) knows the frequency of the tire and the instantaneous angular position of the tire, the ECU has the information required to determine the periodic content of anything in the subsystem, and can, for example, decompose the torque variation (i.e., look for and extract frequency content present in the output signal from the torque transducer.) Based on the position of the corners, the corrections to motor current that are required to counteract the excitation can be determined. In particular, if the transfer function of the motor into the system, frequency of the tire and the instantaneous angular position of the tire, are known, by observing the excitation coming from a corner, the excitation can be counteracted by injecting a periodic signal from the motor to identically counteract the excitation coming from the corner.

The rack mounted electric power steering (EPS) system 10 illustrated in FIG. 1 includes wheel sensors 98 that are used to determine the wheel speed and/or the relative angular position of the wheel. These wheel sensors 98 are coupled to an Electronic Control Unit (ECU) (not shown) via wired connections. When such wired connections are present, the ECU has direct access to signals that are proportional to angular movement of the tire. The ECU can use these signals to determine the absolute angular position of the tire, and can then translate the angular position of the tire to angular velocity of the tire via differentiation. These signals can then be used to determine the frequency needed to cancel out the periodic vibrations generated by one or more wheel assemblies or corners.

However, in most vehicles today such wired connections to the EPS controller are not available and introducing them would require a substantial investment since new sensors 98 and, or additional wires and, or additional electronics would be required. In addition, most, if not all, existing controller electrical connectors do not have the space capacity to readily accept additional pins to accommodate the additional wires, so new pins would have to be added to the connectors to accommodate the new wired connections. In short, this departs from standard hardware and is costly.

The disclosed embodiments eliminate the need for additional sensors 98, wiring and additional electronics as previously described. A steering system 200 for an EPS system of a vehicle including an electronic controller unit (ECU) 282 that includes a SWV suppression controller module 280 will now be described with reference to FIGS. 2 and 3-4 respectively.

Prior to describing these embodiments, it is noted that although the embodiments of the present invention can be applied to any conventional rack mounted EPS system similar to that shown in FIG. 1, those skilled in the art will appreciate that the embodiments of the present invention can also be applied to a conventional column mounted EPS system. In other words, the disclosed embodiments have no particular dependency on the type of EPS system and are equally applicable to both rack mounted EPS systems and column mounted EPS systems.

Figure 2:
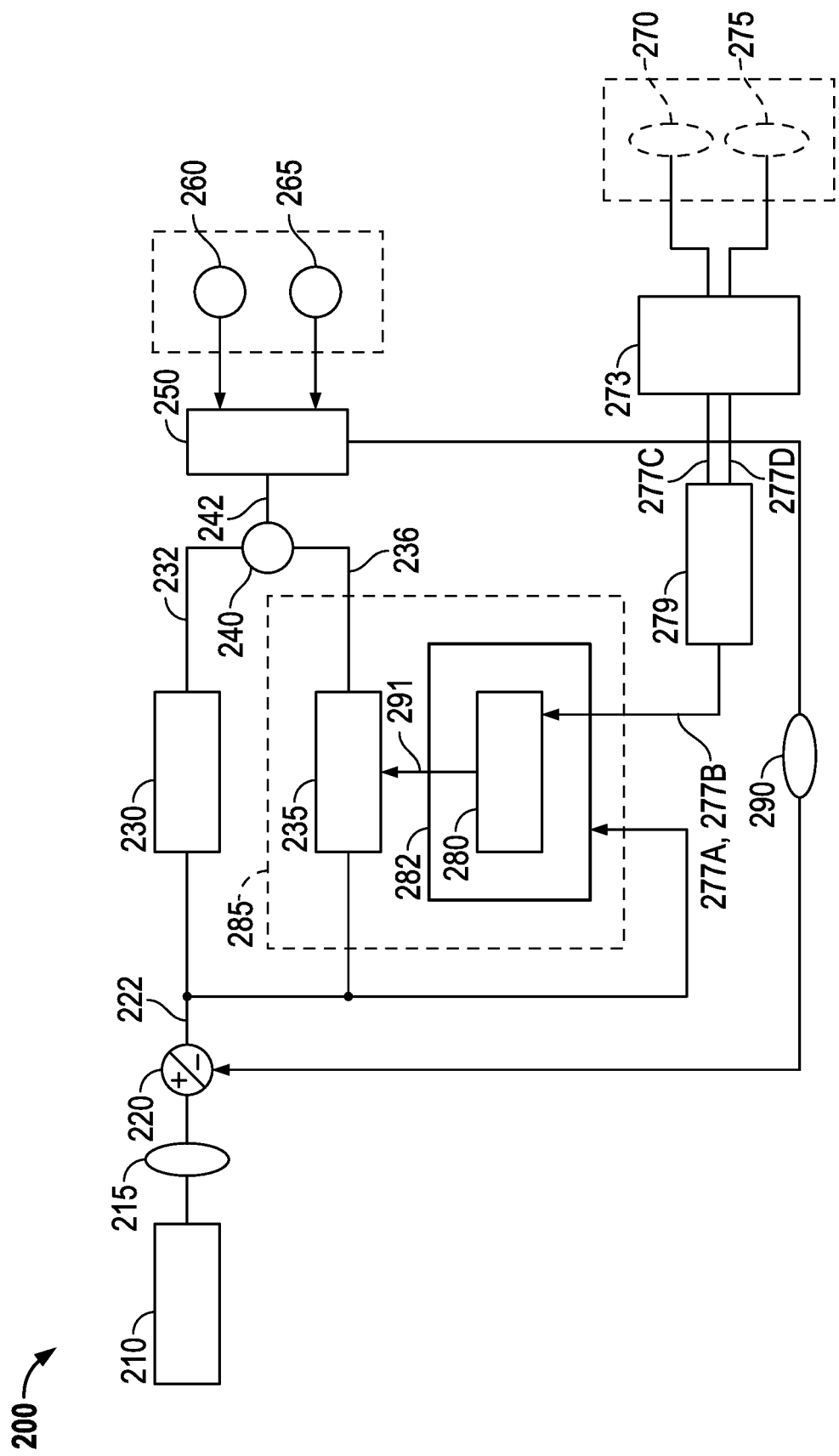
FIG. 2 is a block diagram of a steering system including feedback control system for an EPS system of a vehicle in accordance with some of the disclosed embodiments.

FIG. 2 is a block diagram of a steering system 200 for an EPS system of a vehicle in accordance with some of the disclosed embodiments. The SWV suppression controller module 280 is designed to reduce or "attenuate" SWVs at the steering wheel of the vehicle.

The steering wheel impedance (SWI) ($Z_{SW}(s)$) 210 reacts the dynamic loading or impedance at the steering wheel that resists the combination of driver torque and the column shaft torque. The steering wheel impedance (SWI) ($Z_{SW}(s)$) 210 varies as a function of frequency included in the LaPlace variable s. The SWI ($Z_{SW}(s)$) 210 not only accounts for inertial resistance of the steering wheel, but also takes into account hand/arm loading on the steering wheel as well as other effects of steering column bearings and interfacial conditions at sliding interfaces of the column. Block 215 represents the angular displacement ($\theta_{above\_sensor}$) of the steering wheel about its spin axis (i.e., the steering wheel angle). During noticeable vibrations, the dynamic angular displacement ($\theta_{above\_sensor}$) 215 can be observed in fractions of a degree.

The system 200 includes a path between block 250 and differencing block 220.

There is a difference between the angular displacement ($\theta_{above\_sensor}$) 215 of the portion of the EPS system that is located "above the torque sensor" and angular position ($\theta_{below\_sensor}$) 290 of the portion of the EPS system that is located "below the torque sensor", and for linearly elastic material as is typical of the torque sensor, will be proportional to the torque transmitted through the sensor. There are many sensors for generating electrical signals responsive to the action of applied torque that can be effectively used with the disclosed embodiments. As examples, those relying on angular displacements at the proximate attachment extremities of a calibrated torque element determinative of relative twist between the attachment extremities responsive to torque, magnetostrictive transduction or those that are shear strain responsive. Commonly used sensors in EPS, generating a monotonic relationship between torque and generated electrical signal, can be reliably and effectively used with the disclosed embodiments. These, and others, will result in non-zero dynamic differences in relative angular displacement at the above and below proximate sensor locations, responsive to applied dynamic torque and are monotonic in relative displacements with increasing torque thereof. No loss in generality is intended with the illustrations herein citing reliance on the difference in angular displacements at the locations proximate "above the torque sensor" and "below the torque sensor". This particular mechanization and elaborations are merely provided to aid illustration and are not exclusionary of any sensor capable of monotonic torque to electrical transduction. In rack-mounted EPS systems, such as that illustrated in FIG. 1, elements that are located above the torque sensor can include the steering wheel (SW), steering column, I-Shaft, and flex couplings, etc., and elements that are located below the torque sensor can include the pinion, rack, EPS motor, tie rods, and the corner suspension. By contrast in column-mounted EPS systems, parts of the steering column are shifted to below the torque sensor and the EPS motor is moved to the column such that elements that are located below the torque sensor can include, for example, the EPS motor, I-Shaft, flex couplings, tie rods, and the corner suspension. Regardless of whether it is a rack-mounted EPS system or a column-mounted EPS system, one commonality is that the EPS motor is below the torque sensor in both types of EPS systems.

From forward-driven considerations, when the driver turns the SW, this causes a mechanical torque to be applied to a shaft that is coupled to the SW. This also results in a differential displacement or angular difference 222 between the angular position ($\theta_{below\_sensor}$) 290 and the angular displacement ($\theta_{above\_sensor}$) 215. The differencing block 220 represents the angular difference between the angular position ($\theta_{below\_sensor}$) 290 and the angular displacement ($\theta_{above\_sensor}$) 215, and outputs an angular difference 222 signal. The angular difference 222 signal represents the angular difference between angular position ($\theta_{below\_sensor}$) 290 and the angular displacement ($\theta_{above\_sensor}$) 215.

Figure 3:
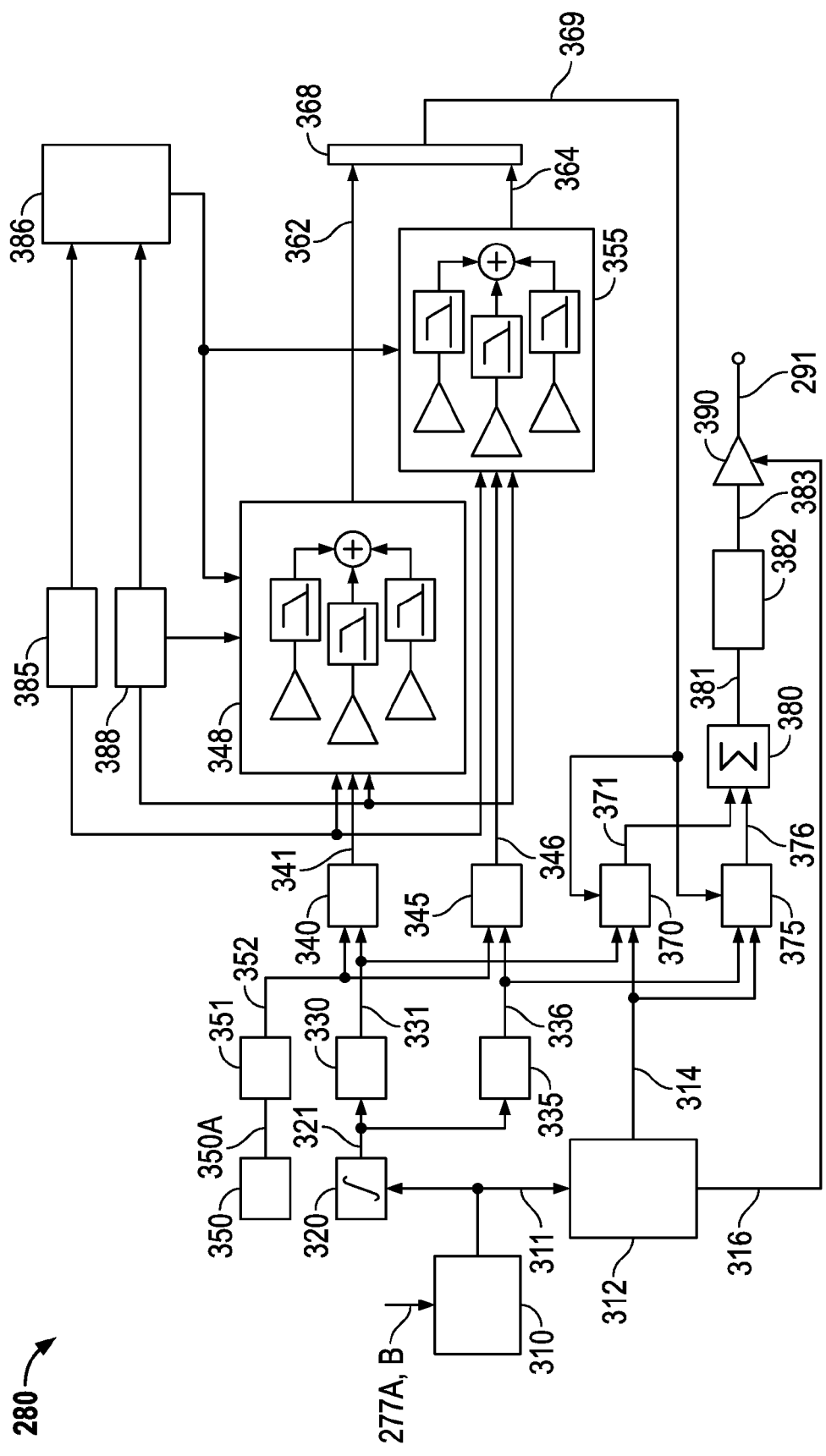
FIG. 3 is a block diagram that illustrates one implementation of the SWV suppression controller module of FIG. 2 in accordance with some of the disclosed embodiments.

The angular difference 222 signal is provided to (or communicated over) a mechanical path 230, an electrical path 235 and the SWV suppression controller module 280. As will be described below, the SWV suppression controller module 280 implements control logic that is illustrated in FIG. 3 to generate a gain-and-phase-compensated motor drive command signal 291 that controls an EPS motor in the electrical path 235 to reduce SWVs at the vehicle's SW.

The mechanical path 230 represents the mechanical portion of the EPS system, along the mechanical path from the torque sensor to the tie-rods. (Anything outward of the tie-rods is a corner and is not part of the mechanical path 230.) The mechanical path 230 transmits the driver-side and reactions to the reverse driven-corner torques. In a rack mounted EPS system, the driver torque represents a mechanical action or reaction that is applied, via the shaft and the pinion. The pinion contacts the rack and thus is kinematically coupled to the translational motion of the rack.

The electrical path 235 includes the transducer signal and the electric motor (not shown). The transducer signal represents the angular difference 222 as an input that determines control of the electric motor. For forward-driven characteristics, the input indicates how much torque the driver is exerting on the SW, and may be proportional to the torque being exerted by the driver at the SW. In response to this input, the electric motor rotates to generate a motor assist torque 236. The motor assist torque 236 represents the additional torque generated by the electric EPS motor that is applied to assist the driver in steering of the vehicle. This way, and under consideration of forward-driven properties, the electric motor (not shown) assists the driver in providing the torque required to steer the vehicle.

Torques 232, 236 are summed at summing block 240 to generate summed torque 242 that is provided to block 250. The summed torque 242 represents the combined torque which enables steering and reacts the corner loading through the tie rods. Thus, together the torque 232 and the motor assist torque 236 provide a summed torque 242 that is used to overcome or react the corner loads of the vehicle. For example, in a rack-mounted EPS system, this torque 242 is applied to the rack to effectuate the steering of the corners, whereas in a column-mounted EPS system, torque 242 is applied to the column shaft (below the torque sensor) to effectuate the steering of the corners.

Block 250 represents the impedance ($Z_{CORNER}(s)$) of the left front corner and the right front corner as a function of frequency. The impedance 250 is dynamic in nature and is based on mass of the corner, rotary resistance of the corner, damping of the corner, and dynamic properties of the tire among others.

Blocks 260, 265 represent excitations at the left front corner of the vehicle and the right front corner of the vehicle, respectively, which are also referred to herein as the left-front corner excitation 260 and the right-front corner excitation 265. These excitations 260, 265 can arise from a variety of sources including, but not limited to, non-uniformities of the tire and/or wheel, any imbalance in any of the rotating parts of the corner, any mounting eccentricities in the assembly of the rotating parts of the corner, etc. The excitations 260, 265 at the respective corners may cause angular displacement ($\theta_{above\_sensor}$) 215 that is transmitted to the steering wheel, and may be observed as SWVs by the driver.

Feedback Loop

Based on these inputs, block 250 contributes to the angular position ($\theta_{below\_sensor}$) 290 of the portion of the EPS system that is located below the torque sensor. For instance, in a rack-mounted EPS system, block 290 represents angular position of the pinion, whereas in a column-mounted EPS system, block 290 represents angular position of the steering column below the torque sensor, on the motor side of the of the EPS system.

Without some mechanism for suppressing their effects, when the excitations 260, 265 from the left front tire and the right front tire are applied to the respective corners, this will cause angular displacement ($\theta_{above\_sensor}$) 215, which may be observed as SWVs by the driver. To reduce the SW vibrations produced at the SW, it is helpful to characterize the relationship between the excitations 260, 265 applied to the corners and the vibratory effects that result at the SW.

Control block 285 includes the electrical path 235 and the ECU 282 that includes the SWV suppression controller module 280.

Controller Module

When the angular difference 222 is as close to zero as possible, then the torque of the torque sensor will also go to zero since the two are linearly related, and if the torque of the torque sensor goes to zero, then the angular displacement ($\theta_{above\_sensor}$) 215 will likewise go to zero.

As such, the SWV suppression controller module 280 (illustrated in greater detail in FIG. 3) generates the gain-and-phase-compensated motor drive command signal 291 to adjust current supplied to the EPS motor to reduce the angular difference 222. More specifically, when SWV suppression controller module 280 is operated at a particular frequency of interest, the gain-and-phase-compensated motor drive command signal 291 is applied to the EPS motor at the electrical path 235 so that the EPS motor is supplied with the correct current to produce a condition that will reduce the angular displacement ($\theta_{above\_sensor}$) 215. In short, if completely effective, and for illustration purposes only, this will require that the control logic functions to ensure that the magnitude of the angular position ($\theta_{below\_sensor}$) 290 and the angular position ($\theta_{above\_sensor}$) 215 are approximately equal so that their difference 222 is approximately zero (e.g., as close to zero as possible) to result in approximately zero torque being produced at the SW. As a result, SWVs can be suppressed/attenuated so that the operator of the vehicle experiences/senses minimal or no vibration at the SW at that particular operating frequency of interest regardless of the particular value of the SWI ($Z_{SW}(s)$) 210. It is noted that any low frequency SW motions, as for example, those typical of steering maneuvers, are virtually unaffected by the SWV suppression controller module 280 while operating at normal highway speeds.

To ensure that the difference 222 between angular position ($\theta_{below\_sensor}$) 290 and the angular position ($\theta_{above\_sensor}$) 215 is reduced (so that SWVs can be reduced), electrical path 235 and SWV suppression controller module 280 must be operated at the correct periodic frequency. Determination of the correct frequency requires knowledge of the angular velocity and position of the tires over a period of time. As will be described with reference to FIG. 3, the SWV suppression controller module 280 can be used to determine the correct frequency even in the absence of wired connections to the front tires to determine their angular velocity and position.

Further elaborating, ABS pulsetrain information that is available to the ECU over the vehicle's LAN can be used to estimate the angular velocity and position of the tires over a period of time, and these estimates can then be used to determine the correct frequency. For example, in one implementation, ABS pulsetrain information is regularly communicated over the LAN, which indicates that a tire has rotated over a certain angular movement during a certain period of time. The ECU can use this information to compute an estimated angular velocity of the tire, and then can integrate the estimated angular velocity of the tire to generate an estimated angular position of the tire.

More specifically, block 270 is an incremental angular position encoder 270 for the left front tire (without absolute reference), and block 275 is an incremental angular position encoder 275 for the right front tire (without absolute reference). The encoders 270, 275 generate high resolution incremental angular position information 277C, 277D corresponding to the left front tire and right front tire, respectively. The high resolution incremental angular position information 277C, 277D comprises pulses that are typically communicated to the brake ECU 273. The brake ECU 273 processes these signals and communicates relevant information of incremental rotation angles 277A, 277B, commonly in coarser intervals than that available at 277C, 277D and corresponding coarser time durations onto the LAN 279 thereby available to the EPS controller 282. In one implementation, the angular position information 277A, 277B can be anti-lock braking system (ABS) pulse train information (e.g., wheel position measurements and time-stamps). As will be described in greater detail below, the ECU 282 receives angular position information 277A, 277B, and uses these pulses to determine/estimate angular velocity and angular position of the tire. As will also be described below, the SWV suppression controller module 280 can use the estimated angular velocity and estimated angular position of the tire (along with other amplitude and phase adjustments described below) to ensure that the SWV suppression controller module 280 operates at the correct frequency to ensure that the SWV suppression controller module 280 can reduce the angular difference 222.

However, because the angular velocity and position of the tire derived from intermittently communicated information are estimates, they do not represent the precise angular frequencies that are identical to that of the tires (i.e., the estimates will occur at frequencies that are close, but not identical to, the frequencies of the tires).

As such, the SWV suppression controller module 280 (FIG. 3) is required that detects periodic content in an output signal 351 of a dynamic torque sensor at an angular frequency of interest, and then constructs the gain-and-phase-compensated motor drive signal 291 (at this periodic frequency) that is designed to reduce the periodic fluctuations. More specifically, the controller extracts information from ABS pulse trains provided over the vehicle's LAN to generate estimates of instantaneous tire position and angular velocity, which are used to generate carrier signals that are then processed to extract periodic fluctuations of the torque sensor. The estimated tire frequency is also applied to a stored inverse motor drive-to-sensor torque transfer function that is a function of tire frequency to generate phase and gain adjustments that can be applied to carrier signals along with the extracted periodic fluctuations of the torque sensor to generate the gain and phase compensated motor drive signal. The gain-and-phase-compensated motor drive signal 291 is fedback to the electric motor to suppress the periodic content in the output signal of the torque sensor to suppress vibrations at the vehicle's steering wheel.

Figure 4:
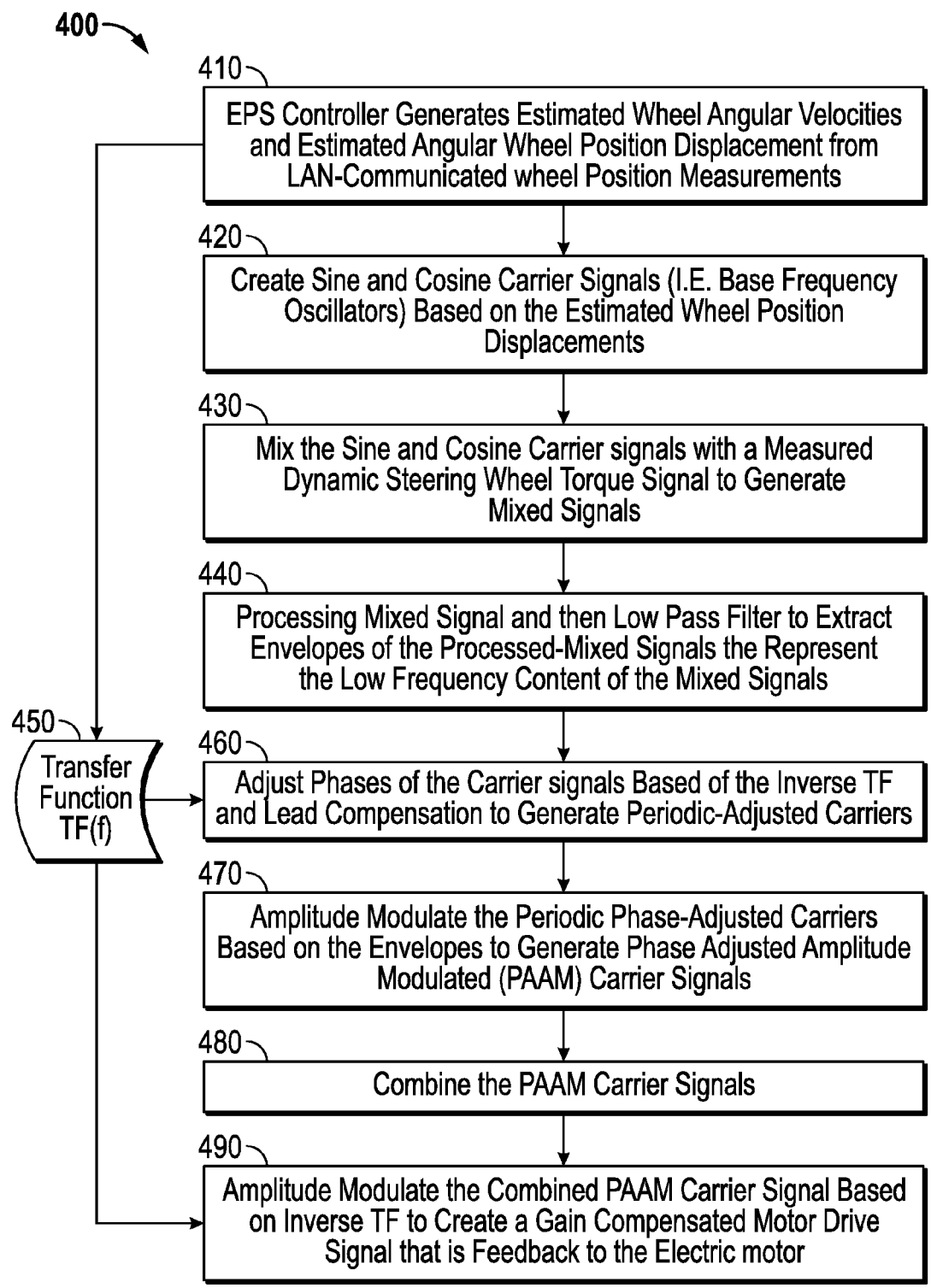
FIG. 4 is a flow chart illustrating a method for reducing SWVs at a steering wheel in accordance with some of the disclosed embodiments.

FIG. 3 is a block diagram that illustrates one implementation of the SWV suppression controller module 280 of FIG. 2 in accordance with some of the disclosed embodiments. FIG. 4 is a flow chart illustrating a method 400 for attenuating (i.e., reducing/suppressing) SWVs at a steering wheel in accordance with some of the disclosed embodiments. For sake of brevity, method 400 will be described below with reference to FIG. 3 to explain how various method 400 steps translate when applied to the control architecture illustrated in FIG. 3. However, those of ordinary skill in the art will appreciate that method 400 can be applied to control architectures other than the SWV suppression controller module 280 illustrated in FIG. 3.

As mentioned above, tire angular position information 277A, 277B that has periodic frequency content is regularly communicated over the in-vehicle LAN 279 to the SWV suppression controller module 280. Method 400 begins at step 410, where the SWV suppression controller module 280 generates estimated angular velocities and estimated angular position displacements of the front tires/corners from the angular position information 277A, 277B communicated over a LAN.

With reference to FIG. 3, step 410 may be implemented at blocks 310 and 320 as follows. From the vehicle's LAN 279, the estimator module 310 receives intermittent information regarding the change in angular position of the tires over a certain increment of time (e.g., a number (N) of pulses received over time interval (T)) for each of the two front tires. The estimator module 310 uses these variables to compute and estimate instantaneous angular velocity of each tire, and then computes a weighted average of the instantaneous angular velocities to generate an estimated instantaneous angular velocity 311 signal. The estimated instantaneous angular velocity 311 signal represents the estimated instantaneous angular velocity of a virtual rotating tire that is also referred to herein as the "estimated tire frequency." Because the estimated tire frequency 311 is only estimated using intermittent data from the LAN, it can only be assumed to be "near" the actual tire frequency.

First Stage: Carrier Signal Generation and Heterodyning

The estimated tire frequency 311 (or estimated angular velocity 311) signal is then integrated (at integrator module 320) to generate an estimated angular position 321 signal that corresponds to the estimated angular position of the virtual tire.

At step 420, the SWV suppression controller module 280 creates, based on the estimated angular position 321 signal, two sinusoidal-shaped carrier signals 331, 336 at the estimated tire frequency 311, which is "near" the actual tire frequency. In particular, a sine-function carrier signal 331 and a cosine-function carrier signal 336 are generated at the estimated tire frequency 311 (i.e., the periodic frequency that corresponds to the estimated angular velocity of the virtual tire). In other words, the carrier signals 331, 336 serve as base frequency oscillators at the circular frequency of the virtual tire. With reference to FIG. 3, step 420 may be implemented at blocks 330 and 335 as follows.

Sine function generator module 330 receives the estimated angular position 321 signal, and generates a sine-function carrier signal 331 at the periodic frequency that corresponds to the estimated angular velocity 311 of the virtual tire. Similarly, the cosine function generator module 335 receives the estimated angular position 321 signal, and generates a cosine-function carrier signal 336 at the periodic frequency that corresponds to the estimated angular velocity 311 of the virtual tire. The cosine-function carrier signal 336 is 90 degrees out of phase with respect to the sine-function carrier signal 331. The sine-function carrier signal 331 and the cosine-function carrier signal 336 are a set of coincident and quadrature generators (i.e., arbitrarily referenced in-phase and out-of-phase wave generators at the frequency of the periodic disturbance signal).

Sensor 350 generates a periodic electrical torque signal 350a that is representative of or proportional to periodic mechanical torque sensed by the torque sensor (i.e., that represents the torque experienced at the torque sensor). Sensor 350 passes the periodic electrical torque signal 350a to a band-pass filter 351, producing filtered torque signal 352. In one implementation the corner frequencies are set to 10 Hz for the high-pass and 20 Hz for the low-pass of this band-pass filter 351. The exact value of these frequencies will vary for each vehicle application, and the 10 Hz, 20 Hz corner frequencies are exemplary for one non-limiting implementation. The periodic electrical torque signal 350a originating from the sensor 350 represents the measured dynamic steering wheel torque, and can also be referred to herein as a "torque signal" 350a. The torque signal 350a has periodic content at the frequency of the carrier signals 331, 336; however, the amplitude of the periodic component of torque signal 350a and the phase offset between the periodic electrical torque signal 350a and the carrier signals 331, 336 are unknown and must be determined by subsequent actions of the SWV suppression module 280. In one implementation, the sensor 350 receives the mechanical in-line torque sensed between the steering wheel and the gearing of the EPS motor. In a column mounted EPS system, the sensor 350 is typically installed between steering wheel and the gearing of the motor to the steering wheel shaft (i.e., integrated within steering column). In a rack mounted EPS system, the sensor 350 is typically installed at the input shaft to the steering gear (i.e., integral with the steering gear mounted external to the passenger compartment).

At step 430, SWV suppression controller module 280 performs a heterodyning function by individually mixing the carrier signals 331, 336 with the filtered torque signal 352 to generate mixed signals 341, 346, respectively. With reference to FIG. 3, step 430 may be implemented at blocks 340, 345 as follows.

Mixer module 340 mixes (e.g., takes the product of) the sine-function carrier signal 331 and the filtered torque signal 352 to generate a first mixed sine signal 341 that relates to the mixed quadrature component of the signal observed at the sensor module 350.

Similarly, the mixer module 345 mixes (e.g., takes the product of) the cosine-function carrier signal 336 and the filtered torque signal 352 to generate a second mixed cosine signal 346 that relates to the mixed coincident component of the signal observed at the sensor module 350.

At step 440, the SWV suppression controller module 280 extracts the content of the mixed signals 341, 346. With reference to FIG. 3, step 440 may be implemented at blocks 348, 355, 368, 385, 386, and 388 as follows.

Prior to describing operation of the extraction modules 348, 355, an explanation of a vehicle forward acceleration gain modulator module 385 and a steering wheel adjustment (SWA) gain modulator module 388 that are used to change the characteristics of the extraction modules 348, 355 will now be provided. The vehicle acceleration gain modulator module 385 receives vehicle speed information over a bus, computes vehicle acceleration, and generates a first adjustment input (based on the vehicle acceleration) that is used to alter the control characteristics (e.g., control gain and, optionally, filtering characteristics) of the first extraction module 348 and the second extraction module 355 to follow transients related to speed fluctuations during acceleration/deceleration of the vehicle. The steering wheel adjustment (SWA) gain modulator module 388 receives steering wheel position signals and generates second adjustment inputs (SWA, d(SWA)/dt) that are used to alter the control characteristics of the first extractor module 348 and the second extractor module 355 during steering according to mapped table entries. Before the adjustments from the vehicle forward acceleration gain modulator module 385 and the steering wheel adjustment (SWA) gain modulator module 388, are applied, the conditions are passed through an hysteretic threshold/persistence threshold module, 386, to ensure that the changing states of the extraction modules, 348, 355, are not subjected to jitter and irregular transitions over desired time intervals. "Jitter", or undesirable relatively frequent and abrupt transition reversals near a crisp threshold, is overcome by introducing switch hysteresis as is known by those skilled in the art. Transition switching can also be accomplished with accompanied time delay, achieving a lagged change from that detected by the crisp thresholds, herein referred to as persistence; this time-lagged transition switching is also known by those skilled in the art. An example of an extreme change in control action of increased response time may comprise holding the value of the extractor output at the inception of steer and maintaining this value until steering ceases. Those skilled in the art will recognize the need to manage the time duration of these "hold" events, since lengthy cessation of control action may result in the inability to track or follow the changing periodic excitation. These changing excitations are generally related to the difference in rotational velocities of the two front tires and are comprehended when the conditions so dictate (e.g., during combined steering and acceleration, use of spare tire, different tire sizes between the front tires, different worn tire conditions). These conditions can be detected in the normal pattern of the amplitude modulation of the sensor and compensation torques and short duration amplitude modulations must be accompanied by only brief cessation of processing action.

At blocks 348, 355, the mixed signals 341, 346 are processed to generate extracted signals 362, 364. The mixed sine signal 341 and the mixed cosine signal 346 may include frequency content other than that present in the filtered torque signal 352. Relatively long term processing of the mixed sine signal 341 and the mixed cosine signal 346 helps to reject any frequency content that is present in these signals that is not attributable to the targeted periodic sensed torque.

Each of the extraction modules 348, 355 implement a proportional-integral-derivative sub-module (PID sub-module) that operates on the mixed sine signal and the mixed cosine signal, respectively, along with optional low-pass filtering. Each PID sub-module involves three separate parameters (represented by triangles in FIG. 3): the proportional (P) value that depends on the present instantaneous input, the integral (I) value that depends on the accumulation of past inputs, and the derivative (D) value that depends on the difference between the current instantaneous input and the previous inputs. The proportional (P) value determines the reaction to the current instantaneous input, the integral value determines the reaction based on the sum of recent inputs, and the derivative value determines the reaction based on the rate at which the input has been changing. The weighted sum of these three actions is used to adjust the drive. The PID parameters used in the calculation can be tuned according to adjustment input parameters that depend on the specific system. By tuning the three constants in the PID sub-module, the sub-module can provide control action designed for specific requirements. Some implementations may require using only one or two of the PID modes to provide the appropriate system control. This is achieved by setting the gain of undesired control outputs to zero. A PID sub-module will be called a PI, PD, P or I sub-module in the absence of the respective sub-module actions.

The first extraction module 348 receives the first mixed sine signal 341, the first adjustment input from the vehicle x-acceleration gain modulator module 385, the second adjustment inputs from the SWA gain modulator module 388, and the condition sensing output of threshold module 386. Based on these inputs the first extraction module 348 processes only the amplitude of the frequency content in the filtered torque signal 352 that is in-phase with (and at the particular frequency of) the sine-function carrier signal 331 to generate/extract an extracted sine signal 362 that is predominately a relatively longer term average of the first mixed sine signal 341. The processing includes multiplying the integral of the mixed sine signal 341 by one constant, the amplitude of the mixed sine signal 341 by a second constant, and the derivative of the mixed sine signal 341 by a third constant. These constants may change depending on the inputs from the vehicle forward acceleration gain modulator module 385 and the steering wheel adjustment (SWA) gain modulator module 388 at times prompted by threshold module 386. The extracted sine signal 362 represents the "strength" or amplitude of the filtered torque signal 352 that is in-phase with the sine function generator module 330 adjusted to minimize interaction with operating events.

In one embodiment, the first extraction module 348 comprises a first proportional-integral-derivative (PID) sub-module (represented by the three triangles). The first proportional-integral-derivative (PID) sub-module receives adjustable input parameters from modules 385, 386, 388, and scales the mixed sine signal 341 by applying respective gains of proportional, integral and derivative gain blocks to generate a proportional-scaled sine signal, an integral-scaled sine signal, and a derivative-scaled sine signal. In one embodiment, the respective gains of each of the gain blocks can be varied based on the adjustment input parameters from modules 385, 386, 388.

Similarly, the second extraction module 355 receives the second mixed cosine signal 346, the first adjustment input from the vehicle x-acceleration module 385, the second adjustment inputs from the SWA module 388, and the condition sensing output of threshold module 386. The second extraction module 355 includes similar gain blocks as the first extraction module 348, and for sake of brevity, these details of the second extraction module 355 will not be repeated here. Based on the inputs the second extraction module 355 processes only the amplitude of the frequency content in the filtered torque signal 352 that is in-phase with (and at the particular frequency of) the cosine-function carrier signal 336 to generate/extract the extracted cosine signal 364 of the second mixed cosine signal 346 that is predominately a relatively longer term average of the second mixed cosine signal 346. The processing includes multiplying the integral of the mixed cosine signal 346 by one constant, the amplitude of the mixed cosine signal 346 by a second constant, and the derivative of the mixed cosine signal 346 by a third constant. These constants may change depending on the inputs from the vehicle forward acceleration gain modulator module 385 and the steering wheel adjustment (SWA) gain modulator module 388 at times prompted by threshold module 386. The extracted cosine signal 364 represents the "strength" or amplitude of the filtered torque signal 352 that is in-phase with the cosine function generator module 335 adjusted to minimize interaction with operating events.

In one embodiment, the first extraction module 348 includes optional filters (i.e., one filter coupled to each triangular gain block of the PID sub-module), and an adder coupled to each of the filters. The second extraction module 355 may also include a similar adder and filters. In one embodiment, to extract the low frequency content (i.e., amplitudes or envelopes) of the processed signals generated by the P, I, D gain blocks, the processed signals may optionally be low-pass filtered within blocks 348, 355.

For example, with respect to the first extraction module 348, an optional filter is provided at the output of each gain block for the proportional-scaled sine signal, the integral-scaled sine signal, and the derivative-scaled sine signal. The filters are designed to extract low frequency content from the proportional-scaled sine signal, the integral-scaled sine signal, and the derivative-scaled sine signal to generate a filtered-proportional-scaled sine signal, a filtered-integral-scaled sine signal, and a filtered-derivative-scaled sine signal, respectively. The adder sums the filtered-proportional-scaled sine signal, the filtered-integral-scaled sine signal, and the filtered-derivative-scaled sine signal to generate a first extracted signal 362 that is a weighted-combined version of the filtered-proportional-scaled sine signal, the filtered-integral-scaled sine signal, and the filtered-derivative-scaled sine signal. In a similar manner, the second extraction module 355 generates a second extracted signal that is a weighted-combined version of the filtered-proportional-scaled cosine signal, the filtered-integral-scaled cosine signal, and the filtered-derivative-scaled cosine signal. For sake of brevity, the details of the second extraction module 355 will not be repeated here.

The gain constants and filter characteristics that are used in modules 348, 355, as well as those in modules 351, 382 are tunable, and can be different for each vehicle model and type and set during the vehicle's development to maximize driver satisfaction. Not all the filters located in these modules need to be used. Indeed, using too many filters may lag the response of the system too much and adversely affect the stability margin. Any changes that are applied to the constants or filter characteristics which reside in module 348 should also be applied identically to module 355.

Multiplexer module 368 multiplexes the extracted sine signal 362 and the extracted cosine signal 364 to generate a multiplexed signal 369. As will be described below, the multiplexed signal 369 is provided to the mixer modules 370, 375.

Motor Drive-to-Sensor Torque Transfer Function and Inverse Motor Drive-to-Sensor Torque Transfer Function Prior to execution of method 400, a transfer function (TF(f)) (represented by block 450) is estimated. The transfer function (TF(f)) represents the transfer function from the EPS motor to sensor 350, and characterizes or quantifies the dynamic influence or effect of the motor drive command on the sensor torque. The transfer function (TF(f)) is a function of the estimated tire frequency 311, f, that is provided from the estimator module 310. In other words, the estimated transfer function (TF(f)) specifies how the command drive to the motor influences torque sensed by sensor 350. The transfer function (TF(f)) is created by exciting the system with known motor drive inputs at various frequencies, and measuring the sensor torque outputs. The motor drive input and sensor torque output signals are then time-wise windowed and put through a Fourier transform. The transform of the sensor torque output is then divided by the transform of the motor drive input. The resulting frequency base complex transfer function will predict the behavior of the sensor torque output given a motor drive input. Those skilled in the art will recognize other potential methods, for example, employing auto and cross spectral densities, and averaging of same over time, to extract estimates of transfer functions in the presence of contaminating signal. The preceding explanation is a simplification of these methods for purposes of explanation only. In one implementation, the estimated transfer function (TF(f)) is stored as a look-up table (LUT) residing in the memory of the SWV suppression controller module 280. The estimated transfer function (TF(f)) is specific for the specific make/model of the particular vehicle, and can be modified/updated over the life-cycle via adaptive learning.

Based on the estimated transfer function (TF(f)), an estimated inverse Transfer Function $(TF(f)^{-1}+\text{Lead compensation}(f))$ table 312 is computed that is utilized at blocks 370, 375, 390 of FIG. 3 as follows. Table 312 is a discretized representation of the transfer function with lead compensation that can be used to determine what system input is needed to result in a desired system output.

Second Stage: Use of Estimated Tire Frequency, Inverse Motor Drive-to-Sensor Torque Transfer Function, and Carrier Signals To Generate A Gain-and-Phase-Compensated Motor Drive Signal Based on the estimated tire frequency 311, f, table 312 generates a complex signal that includes (1) a carrier phase angle adjustment value $(\text{Angle}(TF(f))^{-1}+\text{Lead Compensation}(f))$ 314 that is provided to the first mixer module 370 and the second mixer module 375, and (2) a gain adjustment value $(|TF(f)^{-1}|)$ 316 that is provided to gain module 390. In other words, the retained inverse Transfer Function $(TF(f)^{-1}+\text{Lead Compensation}(f))$ table 312 is used to estimate values of (1) carrier phase angle adjustment value $(\text{Angle}(TF(f))^{-1}+\text{Lead Compensation}(f))$ 314 applied at the first mixer module 370 and the second mixer module 375 and (2) the gain adjustment value $(|TF(f)^{-1}|)$ 316 used at gain module 390, that are used to produce the gain-and-phase-compensated drive signal 291 at gain module 390 so that SWV reductions occur with an adequate vibratory stability margin. The carrier phase angle adjustment value $(\text{Angle}(TF(f))^{-1}+\text{Lead Compensation}(f))$ 314 represents a carrier angle change to be applied at the selected frequency. The gain adjustment value $(|TF(f)^{-1}|)$ 316 represents a gain that is to be applied (at the selected frequency), which is equal to the inverse or reciprocal of the TF gain at the corner periodic frequency.

At step 460, the SWV suppression controller module 280 uses a carrier phase angle adjustment value 314 signal that includes the angle of the inverse $TF(f)^{-1}$ and lead compensation information for improved stability margin (provided in block 312) to adjust the phase of the carrier signals 331, 336 and generate phase-adjusted carrier signals. The phase-adjusted carrier signals are not shown in FIG. 3 since they are internally generated in blocks 370, 375. The phase-adjusted carrier signals (not shown in FIG. 3) are then amplitude modulated by the amplitudes (or envelopes) of the extracted signals 362, 364, which are provided via a combined output signal 369, to generate phase-adjusted-amplitude-modulated carrier signals 371, 376, respectively. With reference to FIG. 3, steps 460 and 470 may be implemented at blocks 312, 370, 375 as follows.

A first mixer module 370 receives the sine-function carrier signal 331 (from sine function generator module 330), the carrier phase angle adjustment value 314 signal (at selected frequency) and the multiplexed signal 369. The first mixer module 370 modifies the sine-function carrier signal 331 based on the carrier phase angle adjustment value 314 signal and the lead compensation information to generate a phase-adjusted sine-function carrier signal (not shown). The first mixer module 370 also receives the combined output signal 369 (that includes content of the extracted sine signal 362 and content of the extracted cosine signal 364). The first mixer module 370 amplitude modulates the phase-adjusted sine-function carrier signal (not shown) based on the envelopes of the extracted signals 362, 364 to generate a phase-adjusted-amplitude-modulated sine carrier signal 371 that will interfere with a disturbance signal that is caused due to excitations 260, 265 at the corners. In one implementation, the first mixer module 370 transforms its input signals by performing the following operation:

$$(\cos(u[4])*u[2]-\sin(u[4])*u[3])*u[1] \quad \text{Equation (1)},$$

where u[1] is the sine-function carrier signal 331, u[2] is the extracted sine signal 362, u[3] is the extracted cosine signal 364, and u[4] is the carrier phase angle adjustment value 314 signal.

Similarly, the second mixer module 375 receives the cosine-function carrier signal 336 (from cosine function generator module 335), the carrier phase angle adjustment value 314 signal (at selected frequency) and the multiplexed signal 369. The second mixer module 375 modifies the cosine-function carrier signal 336 based on the carrier phase angle adjustment value 314 signal and the lead compensation information to generate a phase-adjusted cosine-function carrier signal (not shown). The second mixer module 375 also receives the combined output signal 369 (that includes content of the extracted sine signal 362 and content of the extracted cosine signal 364). The second mixer module 375 amplitude modulates the phase-adjusted cosine-function carrier signal (not shown) based on the envelopes of the extracted signals 362, 364 to generate a phase-adjusted-amplitude-modulated cosine carrier signal 376 that will interfere with a disturbance signal that is caused due to excitations 260, 265 at the corners. In one implementation, the second mixer module 375 transforms its input signals by performing the following operation as indicated in equation (2):

$$(\cos(u[4])*u[3]+\sin(u[4])*u[2])*u[5] \quad \text{Equation (2)},$$

where u[2] is the extracted sine signal 362, u[3] is the extracted cosine signal 364, u[4] is the carrier phase angle adjustment value 314 signal (at selected frequency) and u[5] is the cosine-function carrier signal 336.

At step 480, the SWV suppression controller module 280 combines the phase-adjusted-amplitude-modulated carrier signals 371, 376. For instance, as shown in FIG. 3, summing module 380 receives the phase-adjusted-amplitude-modulated carrier signals 371, 376 and combines them to generate a summed phase-adjusted-amplitude-modulated carrier signal which is then passed on to a band-pass filter module 382 to produce a filtered-summed-phase-adjusted-amplitude-modulated carrier signal 383. In one instance the corner frequencies of the band-pass filter are 10 Hz for the high-pass, and 20 Hz for the low-pass. The exact value of these frequencies will vary for each vehicle application. The filtered-summed-phase-adjusted-amplitude-modulated carrier signal 383 has the correct phase such that when it is applied to the EPS motor, torque generated by the EPS motor reacts dynamic forces generated by the corners. As a result, the disturbance signal at the sensor 350 will be reduced/attenuated in the torque signal 351 that is output by the sensor 350.

At step 490, the filtered-summed-phase-adjusted-amplitude-modulated carrier signal 383 is then amplitude modulated again in accordance with the magnitude of the inverse TF to generate the gain-and-phase-compensated motor drive command signal 291 near the periodic frequency. For instance, as shown in FIG. 3, gain module 390 multiplies the filtered-summed-phase-adjusted-amplitude-modulated carrier signal 383 by the magnitude of estimated inverse Transfer Function ($|TF(f)^{-1}|$) from table 312 to generate the gain-and-phase-compensated motor drive command signal 291 (at the periodic frequency) that is fedback and applied at to the electric motor (not shown). The gain module 390 applies an appropriate gain to the filtered-summed-phase-adjusted-amplitude-modulated carrier signal 383 (that is proportional to the inverse of magnitude of estimated inverse Transfer Function ($|TF(f)^{-1}|$)) so that the gain-and-phase-compensated motor drive command signal 291 cancels the disturbance signal at the torque sensor without causing the system to become unstable. The gain-and-phase-compensated motor drive command signal 291 suppresses the periodic content observed in output signal 351 generated by the sensor 350 so that the angular difference 222 is diminished and SWVs are attenuated at the SW (e.g., at block 215 of FIG. 2). The gain-and-phase-compensated motor drive command signal 291 electromechanically impacts output signal 351 by causing the motor (and torque it generates) to dynamically react to tie-rod forces and relieving the dynamic loads going into sensor 350 thus suppressing the periodic content observed in sensor 350. The method 400 then loops back to step 410.

The SWV suppression can be implemented for suppression of one or more harmonics of periodic content otherwise detected by the driver. The foregoing is merely descriptive of an isolated harmonic, viz, the first harmonic, but the approaches are equally applicable to the $2^{nd}$, $3^{rd}$, $4^{th}$ harmonics, among other harmonics. In order to effectively suppress harmonics other than the first, sine function generator module 330 and cosine function generator module 335 are set to the harmonic frequency targeted for suppression. Targeted second harmonic frequency, for instance, results in operating 330 and 335 at two times the frequency of the first harmonic; targeted third harmonic frequency, for instance, results in operating 330 and 335 at three times the frequency of the first harmonic, and so on. Decisions on the selected harmonics for suppression can be accomplished based on vehicle speed since the likelihood of disturbing SWV occur when the frequency of excitation coincides with a resonant frequency of the vehicle, such as that of the suspension system, steering system, among others. For instance, the second harmonic may be particularly disturbing at relatively low speeds, e.g., 56.32 kilometers per hour or 35 miles per hour, whereas the first harmonic may be particularly disturbing at relatively higher speeds, e.g., 112.65 kilometers per hour or 70 miles per hour. The relationship between disturbing harmonic and speed originates in these dynamic resonant conditions, resulting in disproportionately larger SWV when the frequencies of excitation and resonance coincide. In cases where concurrently active harmonics are present and objectionable, SWV suppression controller module 280 can be reproduced with minor modifications for every harmonic of interest. When so desired, blocks 310, 312, 320, 350 with corresponding signals 277A, 277B, 311, 314, 316 and 321 can be common and shared between the multiple SWV suppression controller modules. In this case, the multiple gain and phase compensated motor drive command signals 291 from the various suppression controller modules are summed and superimposed onto the motor drive commands in a manner identical to that of the descriptions expressed in the foregoing specification. The concurrent operation of the multiple harmonic suppression will not result in undesirable interference between the harmonic drive content at reasonable speeds of operation, e.g., when operated in excess of 48.28 kilometers per hour or 30 miles per hour, owing to the relatively disparate frequencies of the respective harmonics of the SWV suppression frequencies and the relatively High-"Q" notch filters that result from the suppression. ("Q", or "Quality Factor" are defined, for example, in Shock and Vibration Handbook, $3^{rd}$ Edition, Cyril M. Harris, page 2-15, McGraw-Hill Book Company, 1987, ISBN 0-07-026801-0.) Identification of targeted suppression harmonic frequencies, speeds of concern, related corner frequencies of the various filters are specific to individual makes and models of vehicles. The tunings of these parameters are accomplished during the development of vehicles at the vehicle manufacturer's facilities and are very similar to the practices employed for tuning the EPS for conventional assisted performance as well as other electronic and electrical control devices such as ABS, TCS and ESC. As such they are well known to those skilled in the art.

It may also prove advantageous to disable or otherwise inhibit the SRS compensation during operation of the vehicle at times that are deemed unnecessary or compromising, as for example, at speeds insufficient to otherwise produce perceptible SWV, while operating on rough roads, while the expected uncompensated SWV are below thresholds of detection, or under extreme spin-up or spin-down of the tires operating at extremes of circumferential slip or combined slip angle and circumferential slip. These conditions, furthermore, are merely exemplary and not exclusionary of other conditions that are deemed advantageous for inhibiting compensation. In addition, exemplary inhibiting or disabling compensation can be accomplished with the implementation of thresholds of operating speed, SWV, and aperiodic vibratory amplitudes indicative of rough roads detected within the torque sensor or transmitted via LAN from other intelligent ECUs. Furthermore, in any of the aforementioned cases, and others as desired, switching states between active and inactive SRS compensation may be accomplished with the implementation of hysteretic switching with or without persistence thereby avoiding jitter. As a specific example, for the case of disabling SRS compensation based on operating speed, the SRS compensation may be disabled below 72.42 kilometers per hour or 45 miles per hour if accelerating from speeds less than 72.42 kilometers per hour or 45 miles per hour and subsequently disabled below 64.37 kilometers per hour or 40 miles per hour if decelerating from speeds greater than 64.37 kilometers per hour or 40 miles per hour. These conditional activations and deactivations may be beneficial when considerations of vibratory stability margin, power consumption and interaction of the SRS compensatory actions with other performance either during other active control intervention (e.g., anti-lock brake system control (ABS), traction control (TCS), electronic stability control (ESC), etc.), are pertinent. The practices of switching, hysteretic, or otherwise, either with or without persistence, are well known to those skilled in the art and can be readily implemented accordingly.

Thus, methods, systems and apparatus have been described for suppressing steering wheel vibrations (SWVs) that occur within an electric power steering (EPS) system.

Periodic SRS can be attenuated using a control system that implements a SWV-suppression control algorithm that runs in the Electronic Control Unit (ECU) of a vehicle's Electronic Power Steering (EPS) system. The disclosed SWV supression techniques use existing hardware present in any vehicle having EPS system (e.g., EPS motor, EPS torque sensors, wheel speed position sensors, and EPS controller) along with the SWV-suppression control algorithm to suppress SWVs.

The EPS controller uses existing intermittent LAN communications of ABS tonewheel pulsetrains to approximate angular position of front corners and then uses this approximation to create a reliable oscillation reference at the EPS controller. As a result, the need for additional wiring, hardware or other parts can be eliminated, which can provide a significant competitive advantage in contrast to other SWV suppression techniques. The SWV-suppression controller uses a mixing function to extract periodic content in the steering wheel torque sensor signal, and then amplitude modulates co- and quad- generators with the extracted periodic amplitude. The extracted and modulated content is subsequently fed into the motor torque drive, achieving high-"Q" notching for expected periodic content. Because the SWV suppression techniques are software-based (and rely on existing hardware) these techniques are virtually cost-free. Additionally, in simulations it has been observed that when the vehicle is traveling in a range of approximately 80.47 kilometers per hour (or 50 miles per hour) to 144.84 kilometers per hour (or 90 miles per hour) the SWV suppression techniques can be implemented to substantially attenuate/reduce periodic SRS approximately 80% at the steering wheel without interfering with frequency bands associated with steering and handling performance. As such, other vehicle performance characteristics such as steering and handling performance and on-center feel are not compromised.

Figure 5:
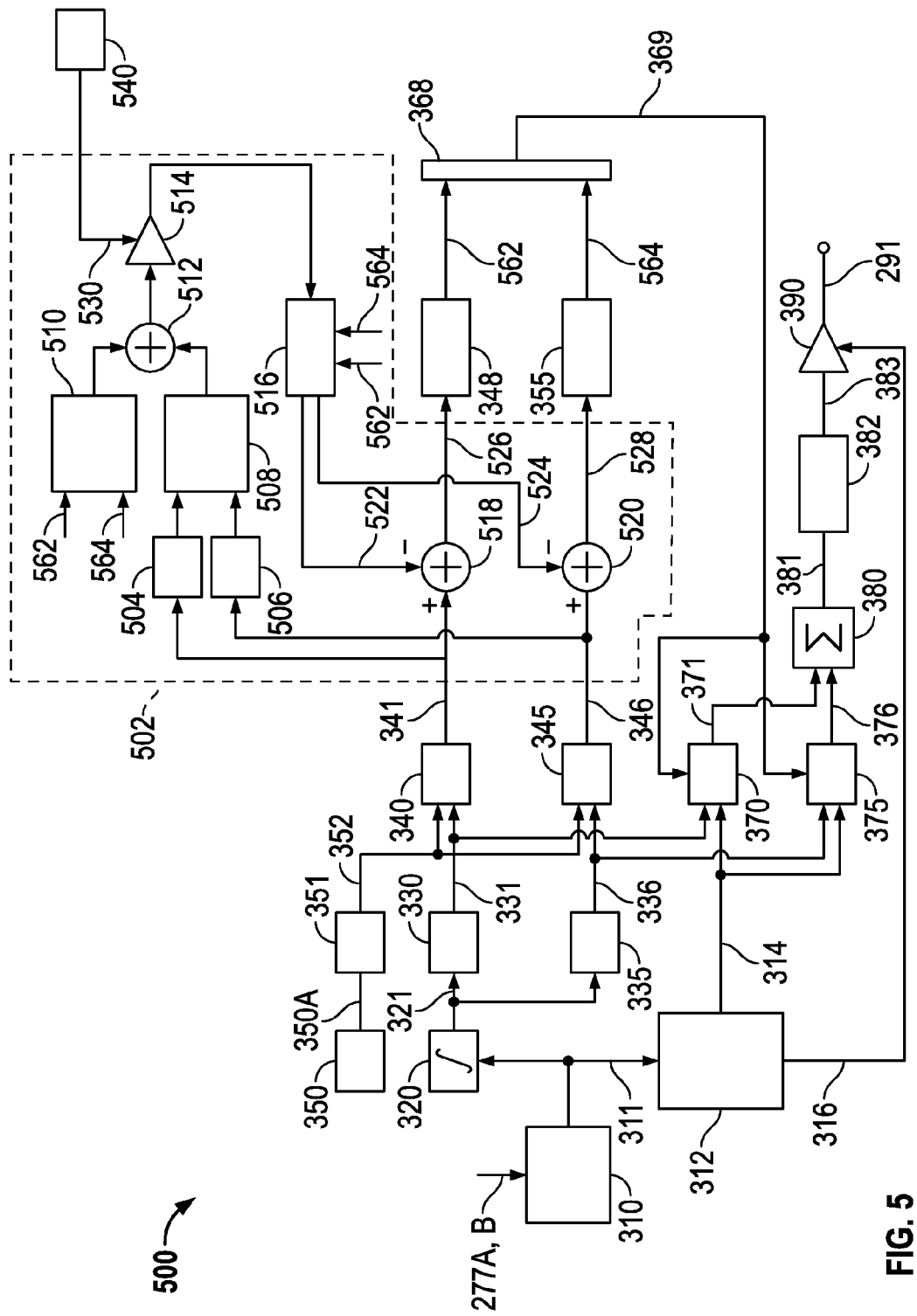
FIG. 5 is a block diagram that illustrates an embodiment of a control module suitable for use as the suppression controller module of FIG. 2 in accordance with one or more embodiments.

FIG. 5 depicts another exemplary embodiment of a control module 500 suitable for use as the SWV suppression controller module 280 in FIG. 2. Various elements of the control module 500 are similar to the corresponding elements described above in the context of FIGS. 2-3, and accordingly, will not be redundantly described here in the context of FIG. 5. Control module 500 includes an attenuation compensation arrangement 502 that counteracts the SWV suppression that would otherwise result from the PID sub-modules of the envelope extraction modules 348, 355. In this regard, at steady-state, the PID sub-modules may suppress nearly all SWVs and drive the measured mixed disturbance torque signals 341, 346 at their inputs to zero; however, in some situations, it may not be desirable to fully suppress the SWVs or it may be desirable to dynamically adjust the amount by which the SWVs are attenuated/suppressed. For example, it may be desirable to reduce the amount of attenuation/suppression supplied by the EPS motor (e.g., motor 90) to conserve power, to improve the longevity and/or durability of the EPS motor, or to otherwise allow SWVs to be communicated to the steering wheel based on real-time operating conditions experienced by the vehicle.

The illustrated attenuation compensation arrangement 502 includes, without limitation, a first low-pass filtering arrangement 504, a second low-pass filtering arrangement 506, a first magnitude determination block 508, a second magnitude determination block 510, a first summation block 512, an adjustable gain module 514, an offset apportioning block 516, a second summation block 518, and a third summation block 520. The elements of the attenuation compensation arrangement 502 are suitably configured to generate offset torque signals 522, 524 that are subtracted from or otherwise combined with the measured mixed disturbance torque signals 341, 346 to reduce the amount by which the control module 500 attenuates/suppresses SWVs based on the current magnitude of the configurable gain provided by the adjustable gain module 514. In this regard, in exemplary embodiments, the adjustable gain module 514 is coupled to a gain control module 540.

Gain control module 540 may receive inputs indicating various operating conditions for the steering system (e.g., gross torque, cumulative usage and potential cumulative wear effects based on cumulative usage, and the like) and/or the gain control module 540 may receive inputs from various ECUs, such as a brake ECU (e.g., brake ECU 273), or another external control module. Based on the received inputs and the desired performance for the EPS system (accounting for allowable operation and attenuation based on considerations such as, for example, operating conditions, specific power consumption, expected life consequences and vibratory suppression needs of the system), the gain control module 540 generates a control signal 530 indicative of a desired amount of gain to be provided by the adjustable gain module 514, which correlates to the desired amount by which the SWVs are attenuated/suppressed. In this regard, the amount of attenuation/suppression of SWVs may vary dynamically based on cumulative usage of cancellation, amount of cancellation, the speed or velocity of the vehicle, the current operating condition of the vehicle and/or a vehicle sub-system (e.g., whether or not the brakes are being applied), or other real-time operating conditions experienced by the vehicle. In some embodiments, the control signal 530 may be provided by the table 312 as an output offset gain value determined based on the estimated instantaneous angular velocity 311 of the one or more tires of the vehicle.

In exemplary embodiments, the value for the offset gain applied by the adjustable gain module 514 may range from 0 to 1, with 0 representing a gain applied by the adjustable gain module 514 that results in SWVs being maximally attenuated/suppressed by the control module 500 (e.g., substantially zero SWVs communicated to the steering wheel at steady state) and 1 representing a gain applied by the adjustable gain module 514 that results in SWVs being minimally attenuated/suppressed by the control module 500.

As described above in the context of FIGS. 2-4, the filtered torque signal 352 contains the relatively higher frequency components of the total measured torque 350a observed at the torque sensor 350 that are likely attributable to periodic disturbances within the steering system. In exemplary embodiments, the low-pass filtering arrangement 504 is coupled to the output of the mixer 340 to receive the mixed quadrature component 341 of the filtered torque signal 352, and the low-pass filtering arrangement 504 low-pass filters the mixed quadrature component 341 to remove higher frequency components of the mixer constituents thus yielding the amplitude of the quasi-envelope of the quadrature periodic disturbance torque. In an equivalent manner, the second low-pass filtering arrangement 506 is coupled to the output of the block 345 to low-pass filter the mixed coincident component 346. Thus, the output of the low-pass filtering arrangement 504 is a low-pass filtered version of the mixed quadrature (quad) component 341 while the output of the second low-pass filtering arrangement 506 is a low-pass filtered version of the mixed coincident (co) component 346. In accordance with one or more embodiments, the cutoff frequency of the low-pass filters implemented by the low-pass filtering arrangements 504, 506 is chosen to be less than the oscillating frequency of the mixed components 341, 346 and in the range of about 0.1 Hz to about 2.0 Hz, and 0.3 Hz in one embodiment, such that the output of a respective low-pass filtering arrangement 504, 506 is substantially equal to the average value of the respective mixed component 341, 346.

The low-pass filtered versions of the co and quad components at the outputs of the low-pass filtering arrangements 504, 506 are provided to the inputs of the first magnitude determination block 508 which calculates or otherwise determines the amplitude of the phasor (or vector) represented by the low-pass filtered versions of the co and quad components, for example, by calculating the square root of the sum of the square of the low-pass filtered quad component and the square of the low-pass filtered co component. Thus, the output of the magnitude determination block 508 corresponds to the magnitude of the measured steering wheel torque at the angular frequency corresponding to the tires of the vehicle that is attributable to periodic disturbances within the steering system at that angular frequency. For purposes of description, the output of the magnitude determination block 508 (i.e., the magnitude of the measured steering wheel torque at the angular frequency corresponding to the tires of the vehicle) may alternatively be referred to herein as the measured SWV torque envelope.

The inputs of the second magnitude determination block 510 are coupled to the outputs of the extraction modules 348, 355 to receive or otherwise obtain the extracted envelope signals 562, 564, wherein the second magnitude determination block 510 calculates or otherwise determines the amplitude of the phasor (or vector) represented by the quadrature and coincident extracted signals 562, 564. As described above in the context of FIGS. 2-4, the extracted signals 562, 564, in appropriate combination, correspond to the amplitude of the carrier of the motor torque applied by the EPS motor at the angular frequency corresponding to the tires that counteracts the periodic disturbances within the steering system to attenuate SWVs, that is, the amplitude of the disturbance cancellation torque applied by the EPS motor that is correlated with the extracted envelope signals 562, 564. Thus, the output of the second magnitude determination block 510 represents the magnitude of the cancellation torque component of the motor torque applied by the EPS motor to cancel periodic disturbances at the steering wheel. For purposes of description, the output of the second magnitude determination block 510 (i.e., the magnitude of the cancellation torque component of the motor torque applied by the EPS motor) may alternatively be referred to herein as the SWV cancellation torque envelope.

As illustrated in FIG. 5, the first summation block 512 is coupled to the outputs of the magnitude determination blocks 508, 510 to determine the sum of the measured disturbance torque envelope at the angular frequency corresponding to the vehicle tires from the first magnitude determination block 508 and the cancellation torque envelope attributable to the EPS motor from the second magnitude determination block 510. In this regard, the sum of the measured steering wheel disturbance torque envelope and the cancellation torque envelope corresponds to an estimate of the gross (or total) disturbance torque envelope within the steering system, that is, the estimated magnitude of the torque envelope attributable to periodic disturbances within the steering system that would be measured by the sensor 350 if cancellation torque were not being applied by the EPS motor.

As described above, the gain module 514 multiplies the estimated gross disturbance torque envelope at the output of the first summation block 512 by a gain factor corresponding to a desired amount by which the SWVs are to be attenuated/suppressed in order to calculate or otherwise determine the magnitude of an offset torque which is subtracted from the measured disturbance torque envelope (e.g., at summation blocks 518, 520) to ensure that the SWVs are not fully suppressed at the steering wheel (when the gain factor is not equal to 0). The offset apportioning block 516 transforms the offset torque to quadrature and coincident mixed signal components 522, 524 that are in the same coordinate quadrant as the extracted envelope signals 562, 564 such that the quadrature and coincident offset signals 522, 524 negate or otherwise cancel at least a portion of the signals 341, 346. In this regard, the quadrature offset torque component signal 522 is subtracted from the quadrature measured disturbance torque component signal 341 at second summation block 518 and the coincident offset torque component signal 524 is subtracted from the coincident disturbance torque component signal 346 at third summation block 520.

To obtain the offset torque component signals 522, 524 in the appropriate coordinate quadrant, the offset apportioning block 516 obtains a transformation angle ($\theta_T$) by calculating or otherwise determining the two argument coordinate arctangent (commonly referred to as a tan 2 or arc tan 2) of the extracted envelope signals 562, 564. For example, the transformation angle may be determined using the equation $\theta_T$=arc tan 2(y,x), where y represents the value of the quadrature extracted envelope component 562 and x represents the value of the coincident extracted envelope component 564. The offset apportioning block 516 utilizes the transformation angle to apportion the offset torque to the appropriate coordinate quadrant. For example, the quadrature offset torque component 522 may be determined using the equation $\theta_Q$= (g×$T_G$)sin($\theta_T$) and the coincident offset torque component 524 may be determined using the equation $O_C$=(g×$T_G$)cos ($\theta_T$), where $T_G$ is the estimated gross disturbance torque envelope within the steering system determined at first summation block 512 and g is the gain factor applied by the adjustable gain module 514. Thereafter, summation block 518 determines an adjusted quadrature disturbance torque signal 526 as the difference between the mixed quadrature measured disturbance torque signal 341 and the quadrature offset torque signal 522 and summation block 520 determines an adjusted coincident disturbance torque signal 528 as the difference between the mixed coincident measured disturbance torque signal 346 and the coincident offset torque signal 524.

The adjusted quadrature disturbance torque signal 526 and the adjusted coincident disturbance torque signal 528 are provided to the respective envelope extraction modules 348, 355, which, in turn, generate the corresponding quadrature and coincident extracted envelope signals 562, 564 based on the adjusted disturbance torque signals 526, 528 (e.g., at step 440) in a similar manner as described above in the context of FIGS. 3-4 with respect to the unadjusted mixed signals 341, 346. In this regard, the quadrature extracted envelope signal 562 (alternatively, the quadrature extracted envelope component) output by the quadrature envelope extraction module 348 corresponds to the amplitude envelope of the adjusted quadrature disturbance torque signal 526 and the coincident extracted envelope signal 564 (alternatively, the coincident extracted envelope component) output by the coincident envelope extraction module 355 corresponds to the amplitude envelope of the adjusted coincident disturbance torque signal 528. Thereafter, the extracted envelope signals 562, 564 are multiplexed (e.g., by multiplexer module 368) and utilized to generate a gain-and-phase compensated motor drive command signal in a similar manner as described above (e.g., steps 460, 470, 480, 490). In this manner, the offset torque influences the extracted envelope signals generated by the envelope extraction modules 348, 355, which, in turn, influence the subsequently generated gain-and-phase compensated motor drive command signal applied to the electric motor. As a result, the EPS motor applies torque that attenuates the vibrations transmitted to the steering wheel by the desired amount indicated by the control signal 530.

Figure 6:
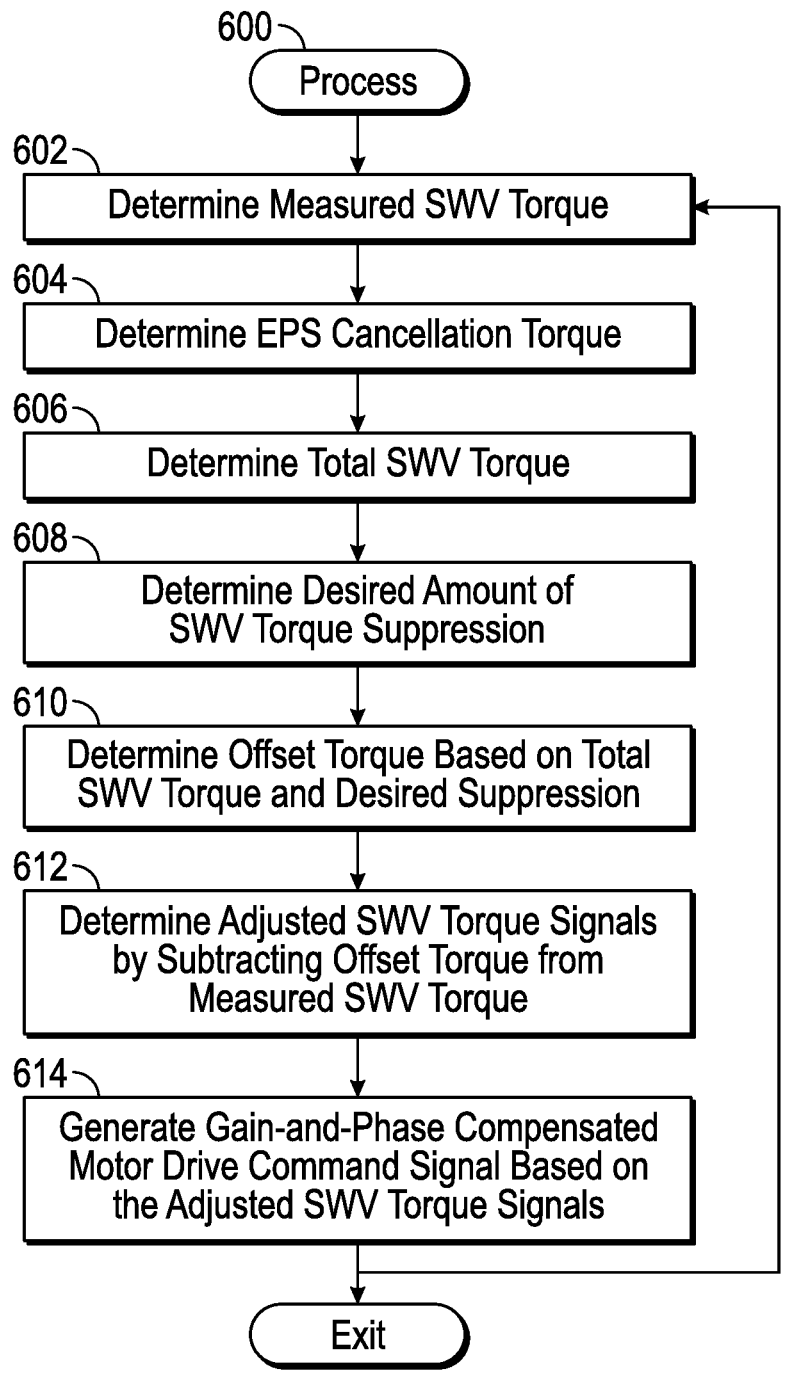
FIG. 6 is a flow chart illustrating a process for dynamically reducing SWVs at a steering wheel by a desired amount in accordance with one or more embodiments.

FIG. 6 depicts an exemplary embodiment of a SWV attenuation process 600 suitable for dynamically adjusting or otherwise controlling the amount of SWV attenuation/suppression provided by an EPS motor (e.g., motor 90). In exemplary embodiments, the SWV attenuation process 600 is performed by the SWV suppression controller module 280 in the steering system 200 of FIG. 2, with the SWV suppression controller module 280 being realized as the control module 500 of FIG. 5. The various tasks performed in connection with the illustrated process 600 may be performed by hardware, suitably configured analog circuitry, software executed by processing circuitry, firmware executable by processing circuitry, or any combination thereof. For illustrative purposes, the following description may refer to elements mentioned above in connection with FIGS. 1-5. In practice, portions of the SWV attenuation process 600 may be performed by different elements of the system 200, such as, for example, the SWV suppression controller module 280, the control module 500, the attenuation compensation arrangement 502, and/or the gain control module 540. It should be appreciated that practical embodiments of the SWV attenuation process 600 may include any number of additional or alternative tasks, the tasks need not be performed in the illustrated order and/or the tasks may be performed concurrently, and/or the SWV attenuation process 600 may be incorporated into a more comprehensive procedure or process having additional functionality not described in detail herein. Moreover, one or more of the tasks shown and described in the context of FIG. 6 could be omitted from a practical embodiment of the SWV attenuation process 600 as long as the intended overall functionality remains intact.

The illustrated process 600 begins by determining the magnitude of the disturbance torque at the angular frequency corresponding to the vehicle tires that was measured by the EPS torque sensor at 602, determining the magnitude of the cancellation component of the torque applied by the EPS motor at 604, and determining an estimate of the gross (or total) disturbance torque within the steering system based on the measured disturbance torque and the cancellation torque at 606. In this regard, as described above, the magnitude determination block 508 of the compensation arrangement 502 determines the magnitude of the disturbance component of the torque measured by the torque sensor 92, 350 at the angular frequency of the vehicle tires by calculating the magnitude of the low-pass filtered quadrature and coincident measured disturbance signals 341, 346 that were determined by mixing the band-pass filtered torque signal 352. The second magnitude determination block 510 of the compensation arrangement 502 determines the magnitude of the cancellation torque component by calculating the magnitude of the extracted envelope signals 562, 564 that were utilized to generate a preceding gain-and-phase-compensated motor drive command signal 291 previously provided to the EPS motor to apply torque that counteracts periodic disturbances within the steering system. Thereafter, the summation block 512 of the compensation arrangement 502 calculates or otherwise determines the estimate of the gross disturbance torque within the steering system by adding the magnitude of the measured disturbance torque from the output of magnitude determination block 508 to the magnitude of the EPS motor cancellation torque from the output of magnitude determination block 510.

In exemplary embodiments, the SWV attenuation process 600 continues by identifying or otherwise determining a desired amount of SWV suppression (or attenuation) to be applied by the SWV suppression controller module at 608, and thereafter calculating or otherwise determining an offset torque based on the desired SWV suppression and the total disturbance torque within the steering system at 610. As described above, the gain control module 540 may identify or otherwise determine the amount by which the SWVs are to be attenuated/suppressed as a value between 0 (maximal attenuation/suppression) and 1 (minimal attenuation/suppression) and provide a control signal 530 indicative of the identified level of suppression to the gain module 514, which, in turn, sets the gain factor applied by the gain module 514. Depending on the embodiment, the gain control module 540 may dynamically determine the desired amount of suppression based on any number of factors (or any combination thereof), such as, for example, the desired power consumption of the EPS motor, the desired longevity and/or durability of the EPS motor, user preferences and/or default settings, real-time operating conditions experienced by the vehicle (e.g., the current vehicle velocity and/or acceleration, and/or the current braking status of the vehicle, or the like). In one embodiment, the gain control module 540 is coupled to the brake ECU 273 which provides an indication of the current status of the braking system (or brakes) mechanically coupled to the vehicle tires, wherein the gain control module 540 identifies or otherwise determines the desired amount of suppression based on the real-time braking status indicated by the brake ECU 273. As described above, the gain module 514 calculates the offset torque by multiplying the estimated gross disturbance torque within the steering system at the output of the summation block 512 by the gain factor corresponding to the control signal 530.

Still referring to FIG. 6, after determining the offset torque configured to provide the desired level of SWV suppression/attenuation at the steering wheel, the SWV attenuation process 600 continues by determining adjusted disturbance torque based on the offset torque at 612 and generating a gain-and-phase compensated motor drive command signal based on the adjusted disturbance torque at 614. As described above, the compensation arrangement 502 determines adjusted disturbance torque mixed signals 526, 528 by transforming the calculated offset torque to quadrature and coincident components 522, 524 in the same coordinate quadrant as the extracted envelope signals 562, 564 and subtracting the quadrature and coincident offset torque signals 522, 524 from the mixed quadrature and coincident signals 341, 346. Thereafter, a gain-and-phase compensated motor drive command signal is generated based on the adjusted disturbance torque signals 526, 528 by generating extracted envelope signals 562, 564 (e.g., step 440), multiplexing the extracted envelope signals 562, 564 into a multiplexed signal 369, and generating the gain-and-phase compensated motor drive command signal using the multiplexed signal 369 (e.g., steps 460, 470, 480, 490). As described above, the gain-and-phase-compensated motor drive command signal causes the EPS motor to adjust the motor torque that assists in steering the vehicle tires in a manner that dynamically reduces or otherwise counteracts periodic torque content at the angular frequency corresponding to the vehicle tires and thereby attenuates the vibrations communicated to the steering wheel. The loop defined by the SWV attenuation process 600 may repeat throughout operation of the EPS system to dynamically adjust the amount by which SWVs are suppressed/attenuated based on real-time operating conditions and/or other criteria.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof. Accordingly, details of the exemplary embodiments or other limitations described above should not be read into the claims absent a clear intention to the contrary.

What is claimed is:

1. A method for reducing vibrations at a steering wheel caused by periodic disturbances in a steering system including the steering wheel and an electric motor configured to apply a motor torque that assists steering by the steering wheel, the method comprising:
   determining a gross torque attributable to the periodic disturbances in the steering system;
   identifying a desired amount of suppression of the vibrations at the steering wheel;
   determining an offset torque based on the gross torque and the desired amount of suppression; and
   generating a motor command signal in a manner that is influenced by the offset torque, wherein the motor command signal influences the motor torque, wherein generating the motor command signal comprises:
      performing at least one heterodyning operation during the generation of the motor command signal.

2. The method of claim 1, further comprising:
   transforming the offset torque to quadrature and coincident offset torque components;
   determining an adjusted quadrature disturbance torque component based on a difference between a mixed quadrature component of a measured torque at an angular frequency of the steering system and the quadrature offset torque component;
   determining an adjusted coincident disturbance torque component based on a difference between a mixed coincident component of the measured torque at the angular frequency and the coincident offset torque component;
   generating a quadrature extracted envelope component based on the adjusted quadrature disturbance torque component, the quadrature extracted envelope component corresponding to an amplitude envelope of the adjusted quadrature disturbance torque component; and
   generating a coincident extracted envelope component based on the adjusted coincident disturbance torque component, the coincident extracted envelope component corresponding to an amplitude envelope of the adjusted coincident disturbance torque component, wherein generating the motor command signal comprises generating the motor command signal based on the quadrature and coincident extracted envelope components.

3. The method of claim 2, wherein transforming the offset torque to quadrature and coincident offset torque components comprises generating the quadrature and coincident offset torque components in a same coordinate quadrant as preceding quadrature and coincident extracted components.

4. The method of claim 2, wherein:
   generating the quadrature extracted envelope component comprises:
      applying one or more of proportional, integral and derivative gains to the adjusted quadrature disturbance torque component to generate one or more first processed signals; and
      filtering and summing the one or more first processed signals to generate a first extracted signal that is a weighted-combined version of one or more of a filtered-proportional-scaled quadrature signal, a filtered-integral-scaled quadrature signal, and a filtered-derivative-scaled quadrature signal; and
   generating the coincident extracted envelope component comprises:
      applying one or more of proportional, integral and derivative gains to the adjusted coincident disturbance torque component to generate one or more second processed signals; and
      filtering and summing the one or more second processed signals to generate a second extracted signal that is a weighted-combined version of one or more of a filtered-proportional-scaled coincident signal, a filtered-integral-scaled coincident signal, and a filtered-derivative-scaled coincident signal.

5. The method of claim 1, further comprising identifying the desired amount of suppression based on real-time operating conditions experienced by a vehicle including the steering system.

6. A method for reducing vibrations at a steering wheel caused by periodic disturbances in a steering system including the steering wheel, at least one tire coupled to the steering wheel, and an electric motor configured to apply a motor torque that assists steering by the steering wheel, the method comprising:
   determining a gross torque attributable to the periodic disturbances in the steering system, wherein determining the gross torque comprises:
      determining a sum of a measured torque component at an angular frequency corresponding to the at least one tire and a cancellation torque applied by the electric motor;
   identifying a desired amount of suppression of the vibrations at the steering wheel;
   determining an offset torque based on the gross torque and the desired amount of suppression; and
   generating a motor command signal in a manner that is influenced by the offset torque, wherein the motor command signal influences the motor torque.

7. The method of claim 6, wherein determining the sum comprises:
- determining the measured torque component as a first magnitude of a first phasor defined by quadrature and coincident components of a filtered torque signal at the angular frequency, the filtered torque signal being obtained from a sensor configured to measure torque in the steering system;
- determining the cancellation torque as a second magnitude of a second phasor defined by quadrature and coincident extracted signals utilized to generate a preceding motor command signal applied to the electric motor; and
- adding the first magnitude and the second magnitude to obtain the sum.

8. The method of claim 7, further comprising low-pass filtering the quadrature and coincident components of the filtered torque signal prior to determining the first magnitude.

9. The method of claim 6, wherein determining the offset torque comprises multiplying the sum by a gain factor corresponding to the desired amount of suppression.

10. A vehicle comprising:
- a steering wheel coupled to one or more tires to steer the one or more tires; and
- an electric motor coupled to the one or more tires to generate a motor torque that assists the steering of the one or more tires; and
- a control module coupled to the electric motor and configured to:
  - determine a gross torque attributable to periodic disturbances in the vehicle;
  - identify a desired amount of suppression for the periodic disturbances at the steering wheel;
  - determine an offset torque based on the gross torque and the desired amount of suppression; and
  - generate a motor command signal in a manner that is influenced by the offset torque, wherein the motor command signal is applied to the electric motor to control the motor torque and attenuate the periodic disturbances communicated to the steering wheel, wherein the generation of the motor command signal comprises: performing at least one heterodyning operation during the generation of the motor command signal.

11. The vehicle of claim 10, further comprising a brake electronic control unit coupled to the control module, wherein the control module is configured to identify the desired amount of suppression based on a real-time braking status indicated by the brake electronic control unit.

12. A vehicle comprising:
- a steering wheel coupled to one or more tires to steer the one or more tires; and
- an electric motor coupled to the one or more tires to generate a motor torque that assists the steering of the one or more tires;
- a sensor to obtain a measured steering torque; and
- a control module coupled to the electric motor and to the sensor, the control module configured to:
  - determine a gross torque, attributable to periodic disturbances in the vehicle, as a sum of a component of the measured steering torque at an angular frequency corresponding to the one or more tires and a cancellation component of the motor torque;
  - identify a desired amount of suppression for the periodic disturbances at the steering wheel;
  - determine an offset torque based on the gross torque and the desired amount of suppression; and
  - generate a motor command signal in a manner that is influenced by the offset torque, wherein the motor command signal is applied to the electric motor to control the motor torque and attenuate the periodic disturbances communicated to the steering wheel.

13. The vehicle of claim 12, wherein the control module comprises:
- a band-pass filter to filter the measured steering torque and obtain a filtered torque signal;
- a pair of mixers coupled to the band-pass filter to mix the filtered torque signal with sinusoidal carrier signals at the angular frequency to obtain mixed quadrature and coincident components of the filtered torque signal at the angular frequency; and
- a magnitude determination block coupled to the pair of mixers to determine the component of the measured steering torque at the angular frequency as a first magnitude of a first phasor defined by the mixed quadrature and coincident components of the filtered torque signal.

14. The vehicle of claim 13, wherein the control module further comprises:
- an offset apportioning block to transform the offset torque to quadrature and coincident offset torque components;
- a first extraction module to generate a quadrature extracted envelope component based on a first difference between the quadrature component of the filtered mixed torque signal and the quadrature offset torque component, the quadrature extracted envelope component corresponding to an amplitude envelope of the first difference; and
- a second extraction module to generate a coincident extracted envelope component based on a second difference between the coincident component of the filtered mixed torque signal and the coincident offset torque component, the coincident extracted envelope component corresponding to an amplitude envelope of the second difference.

15. The vehicle of claim 14, wherein the control module further comprises:
- a second magnitude determination block coupled to the first and second extraction modules to determine the cancellation component as a second magnitude of a second phasor defined by the quadrature and coincident extracted envelope components; and
- an adjustable gain module configured to multiply the sum of the component of the measured mixed steering torque at the angular frequency and the cancellation component by a gain factor to obtain the offset torque.

16. The vehicle of claim 15, the offset apportioning block being coupled to the adjustable gain module, the first extraction module, and the second extraction module, wherein the offset apportioning block is configured to:
- determine a transformation angle corresponding to the quadrature and coincident extracted envelope components; and
- transform the offset torque to quadrature and coincident offset torque components and by apportioning the offset torque according to the transformation angle.

17. The vehicle of claim 16, wherein the offset apportioning block is configured to:
- determine the transformation angle as the two argument coordinate arctangent of the quadrature and coincident extracted envelope components; and
- apportion the offset torque according to the transformation angle by:
  - multiplying the offset torque by a cosine of the transformation angle to obtain the coincident offset torque component; and multiplying the offset torque by a sine of the transformation angle to obtain the quadrature offset torque component.

18. A method for reducing vibrations at a steering wheel caused by periodic disturbances in a steering system corresponding to one or more tires of a vehicle, the steering system including the steering wheel and an electric motor coupled to the steering wheel and the one or more tires to apply a motor torque that assists the steering of the one or more tires by the steering wheel, the method comprising:

determining quadrature and coincident components of a measured disturbance torque at an angular frequency corresponding to the one or more tires;

determining a cancellation component of the motor torque;

determining a gross torque attributable to the periodic disturbances in the steering system based on the cancellation component and the quadrature and coincident components of the measured disturbance torque at the angular frequency;

identifying a gain factor corresponding to a desired amount of suppression of the vibrations;

multiplying the gross torque by the gain factor to obtain an offset torque;

transforming the offset torque to quadrature and coincident offset torque components;

generating a quadrature extracted envelope component based on a first difference between the quadrature component of the measured disturbance torque at the angular frequency and the quadrature offset torque component, the quadrature extracted envelope component corresponding to an amplitude envelope of the first difference;

generating a coincident extracted envelope component based on a second difference between the coincident component of the measured disturbance torque at the angular frequency and the coincident offset torque component, the coincident extracted envelope component corresponding to an amplitude envelope of the second difference; and generating a motor command signal based at least in part on the quadrature and coincident extracted envelope components, wherein the motor command signal influences the motor torque to attenuate the vibrations transmitted to the steering wheel by the desired amount.

19. The method of claim 18, further comprising:

low-pass filtering the quadrature and coincident components of the measured disturbance torque at the angular frequency; and determining a first magnitude of a first phasor defined by the low-pass filtered quadrature and coincident components of the measured disturbance torque at the angular frequency, wherein determining the gross torque comprises adding the first magnitude to the cancellation component.

20. The method of claim 19, wherein determining the cancellation component comprises determining a second magnitude of a second phasor defined by the quadrature and coincident extracted envelope components.

* * * * *